(12) United States Patent
Sakaki et al.

(10) Patent No.: US 9,672,959 B2
(45) Date of Patent: Jun. 6, 2017

(54) WIRE HARNESS AND METHOD FOR MANUFACTURING WIRE HARNESS

(71) Applicants: Furukawa Electric Co., Ltd., Tokyo (JP); Furukawa Automotive Systems Inc., Shiga (JP)

(72) Inventors: Naoya Sakaki, Shiga (JP); Michihiko Tominaga, Shiga (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 77 days.

(21) Appl. No.: 14/439,648

(22) PCT Filed: Oct. 29, 2013

(86) PCT No.: PCT/JP2013/006407
§ 371 (c)(1),
(2) Date: Apr. 29, 2015

(87) PCT Pub. No.: WO2014/068964
PCT Pub. Date: May 8, 2014

(65) Prior Publication Data
US 2015/0294768 A1    Oct. 15, 2015

(30) Foreign Application Priority Data

Oct. 29, 2012  (JP) .................................. 2012-238266
Oct. 29, 2012  (JP) .................................. 2012-238267

(51) Int. Cl.
*H02G 3/04* (2006.01)
*H01B 7/00* (2006.01)
(Continued)

(52) U.S. Cl.
CPC ... *H01B 13/01209* (2013.01); *B60R 16/0207* (2013.01); *H01B 7/0045* (2013.01); *H01B 7/16* (2013.01); *H01B 13/004* (2013.01)

(58) Field of Classification Search
CPC  H01B 13/01209; H01B 13/00; H01B 13/004; H01B 7/0045; H01B 7/16;
(Continued)

(56) References Cited

U.S. PATENT DOCUMENTS 4,435,881 A      3/1984   Yamaguchi et al.
7,307,217 B2 *  12/2007   Daito .................. B60R 16/0215
                                                     174/72 A
(Continued)

FOREIGN PATENT DOCUMENTS

JP    S5793028 U    6/1982
JP    64-81610 A    3/1989
(Continued)

OTHER PUBLICATIONS

International Search Report for PCT Application No. PCT/JP2013/006407, mailed Dec. 10, 2013, 4 pages.

*Primary Examiner* — Angel R Estrada
(74) *Attorney, Agent, or Firm* — Amin, Turocy & Watson, LLP

(57) ABSTRACT

The invention of the present application provides a wire harness with an improved accuracy of the dimension, that can be manufactured with an easy operation. A protector (4) defines at least either one of a bending shape and a branching shape of a plurality of electric wires (2). A cable tie (10) is attached to the electric wires (2), and includes a distal portion (11a) to be attached to the protector (4). The protector (4) includes an engaging portion (13) engageable with the distal portion (11a). Positions of the electric wires (2) and the protector (4) relative to each other are settled by engagement of the distal portion (11a) of the cable tie (10) attached to the electric wires (2) with the engaging portion (13).

8 Claims, 25 Drawing Sheets

(51) Int. Cl.
*H01B 13/012* (2006.01)
*B60R 16/02* (2006.01)
*H01B 7/16* (2006.01)
*H01B 13/004* (2006.01)

(58) Field of Classification Search
CPC .. B60R 16/0207; B60R 16/0215; H02G 3/04; H02G 3/26; H02G 3/28
USPC .......... 174/72 A, 68.1, 68.3, 88 R, 70 C, 95, 174/70 R, 40 CC, 91, 72 C; 248/68.1, 49
See application file for complete search history.

(56) References Cited

U.S. PATENT DOCUMENTS

| | | | | |
|---|---|---|---|---|
| 7,378,592 | B2 * | 5/2008 | Suzuki | B60R 16/0215 174/72 A |
| 8,188,368 | B2 * | 5/2012 | Suzuki | B60R 16/0215 174/72 A |
| 8,575,487 | B2 * | 11/2013 | Agusa | B60R 16/0215 174/72 A |
| 8,847,073 | B2 * | 9/2014 | Tokunaga | B60R 16/0215 174/72 A |
| 9,029,700 | B2 * | 5/2015 | Hara | B60R 16/0215 174/72 A |
| 9,029,701 | B2 * | 5/2015 | Hara | B60R 16/0215 174/68.1 |

FOREIGN PATENT DOCUMENTS

| | | |
|---|---|---|
| JP | 07-35269 A | 2/1995 |
| JP | H0795714 A | 4/1995 |
| JP | 08-249952 A | 9/1996 |
| JP | 2001-266672 A | 9/2001 |
| JP | 2002-225648 A | 8/2002 |
| JP | 2002-343155 A | 11/2002 |
| JP | 2012-157176 A | 8/2012 |

\* cited by examiner

Fig.7
(a)
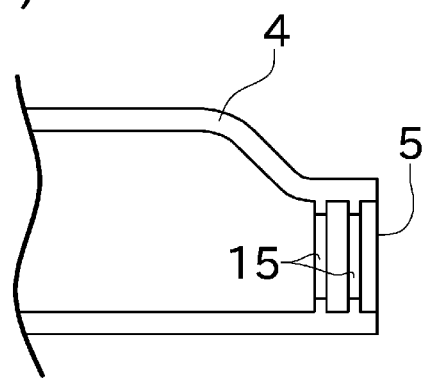
(b)
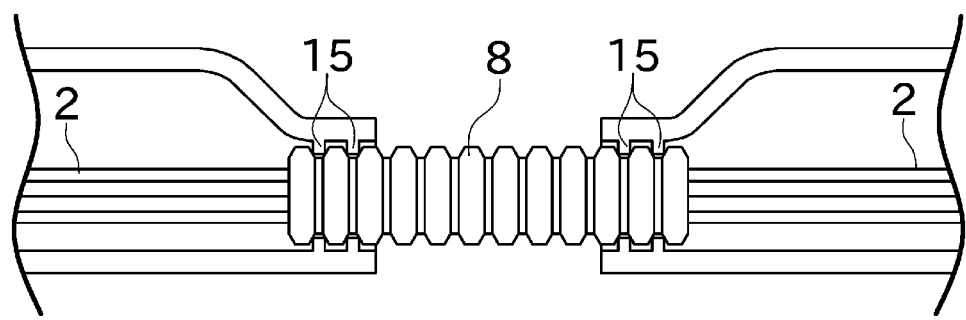

Fig.10
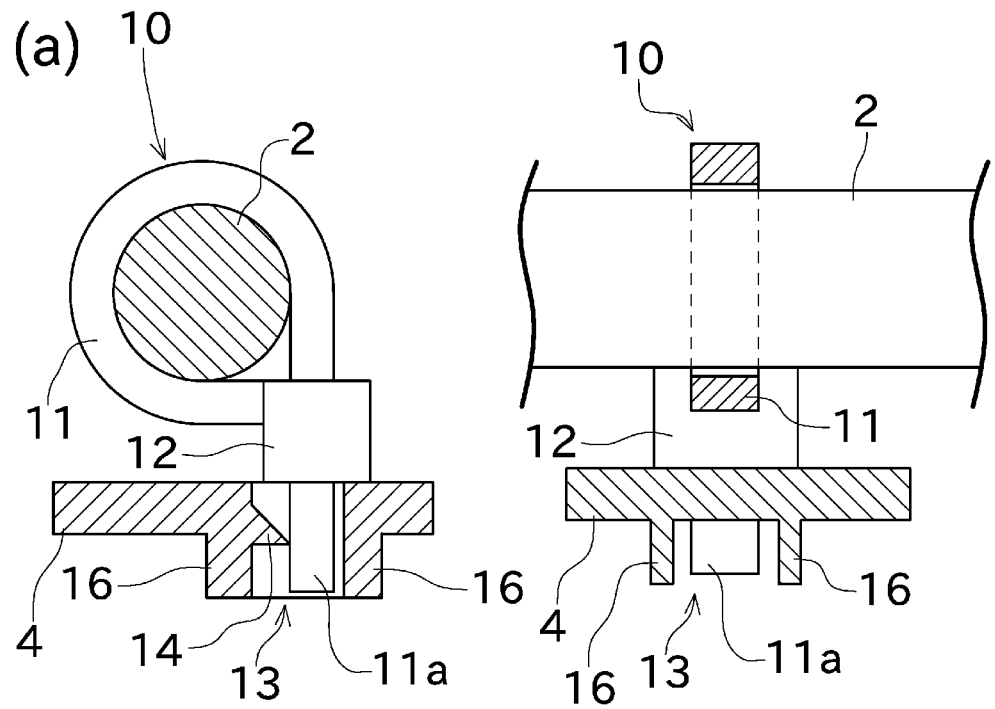
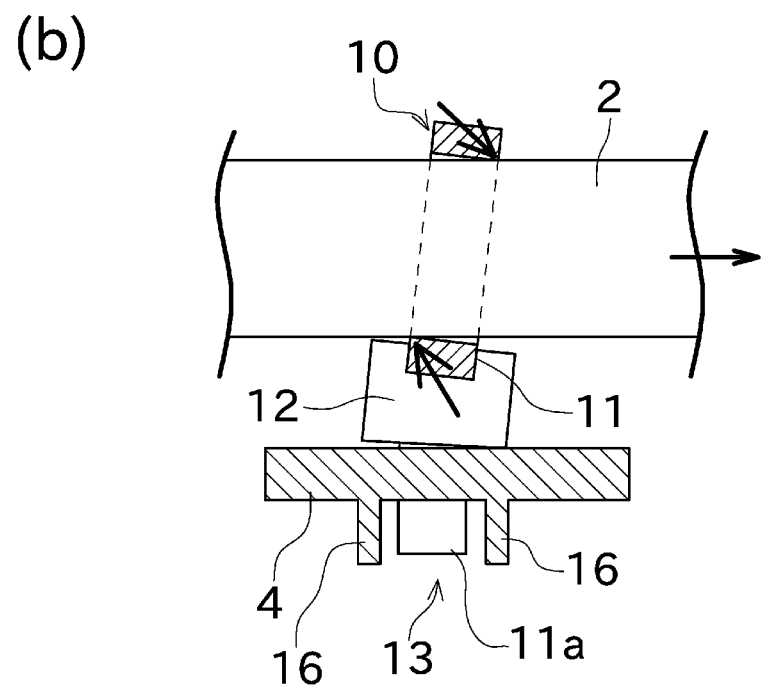

WIRE HARNESS AND METHOD FOR MANUFACTURING WIRE HARNESS

CROSS-REFERENCE TO RELATED APPLICATIONS

This application is a U.S. National Stage application filing under 35 USC §371 of International Application No. PCT/JP2013/006407, filed on Oct. 29, 2013, entitled "WIRE HARNESS AND METHOD FOR MANUFACTURING WIRE HARNESS," which claims priority to Japanese Application No. 2012-238266, filed on Oct. 29, 2012, and which also claims priority to Japanese Application No. 2012-238267, filed on Oct. 29, 2012, the entireties of each of which are incorporated herein by reference.

TECHNICAL FIELD

The present invention relates to a configuration of a wire harness and a method for manufacturing the wire harness.

BACKGROUND ART

A wire harness includes a bundle of a plurality of electric wires formed into a predetermined shape. The wire harness is, for example, wired in a vehicle body of an automobile, and used for power supply to various electrical devices provided in the automobile, communication of control signals among the electrical devices, and the like. Recently, an automobile includes various electrical devices mounted in various parts of a vehicle body, and therefore a wire harness for use in an automobile has a complicated bending and branching shape.

A method for manufacturing such a wire harness is disclosed in, for example, Patent Document 1. Conventionally, a workbench (in the Patent Document 1, an assembly drawing board) called ASSY board has been used in a method for manufacturing a wire harness. A jig (holder) for holding electric wires is provided on the workbench as appropriate.

In this type of manufacturing method, an operator firstly lays a plurality of electric wires so as to form a predetermined bending and branching shape on the workbench. Then, the operator wraps a tape around a predetermined portion of the electric wires laid on the workbench. The tape wrapped in this manner fixes the bending and branching shape of the electric wires, thus forming a wire harness having a predetermined shape.

PRIOR-ART DOCUMENTS

Patent Documents

Patent Document 1: Japanese Patent Application Laid-Open No. 8-249952 (1996)

SUMMARY OF THE INVENTION

Problems to be Solved by the Invention

The conventional manufacturing method requires the operator to move around the workbench in order to wrap the tape around each necessary portion of the electric wires. Since the electric wire laid on the workbench is bent in various directions, the operator has to change his/her posture for each wrapping of the tape. This leads to a difficulty in improving the level of training of the operation. In addition, some orientation of the electric wire may make the operation of wrapping the tape difficult. Moreover, the operation of wrapping the tape is in itself complicated, which needs a long operation time. Furthermore, when a plurality of operators concurrently perform operations on a single workbench, paths of motion of the operators are tangled because each of the operators has to move around the workbench. Therefore, it is impossible for the plurality of operators to concurrently perform operations on the single workbench in an efficient manner. Thus, the conventional manufacturing method involves a problem of a poor efficiency of operation and therefore a low productivity.

The conventional manufacturing method also involves a problem of the likelihood of unstable quality because the level of training of the operation is not likely to improve, as described above. Particularly, the dimension of each part of the wire harness varies depending on the manner of wrapping of the tape, which makes it necessary to examine the dimension of each part of the wire harness manufactured. This leads to an increase in an examination process.

Furthermore, manufacturing a complicated wire harness requires an increase in the size of the workbench accordingly. This results in an extension of the production line of the wire harness.

The present invention has been made in view of the circumstances described above, and an object of the present invention is to provide a wire harness with an improved accuracy of the dimension, that can be manufactured with an easy operation. Another object of the present application is to provide a method for manufacturing a wire harness, in which complicated manufacturing operations are reduced to achieve an improved efficiency of production and a reduced variation in the quality.

Means for Solving the Problems and Effects Thereof

Problems to be solved by the present invention are as described above, and next, means for solving the problems and effects thereof will be described.

In an aspect of the present invention, a wire harness described below is provided. The wire harness includes a plurality of electric wires, a protector, and a fixing member. The protector defines at least either one of a bending shape and a branching shape of the plurality of electric wires. The fixing member is attached to the electric wires, and includes a protector-attached portion to be attached to the protector. The protector includes an engaging portion engageable with the protector-attached portion. Positions of the electric wires and the protector relative to each other are settled by engagement of the protector-attached portion of the fixing member attached to the electric wires with the engaging portion.

Such a configuration in which the protector defines the bending shape or the branching shape of the electric wires is able to improve accuracy of the dimension as compared with the conventional wire harness in which tapes are used to fix the shape of electric wires. Moreover, since the operation of wrapping the tapes around the electric wires is not necessary, a time required for the manufacture of the wire harness can be shortened. The operation of mounting the protector to the electric wires can be easily implemented merely by bringing the fixing member into engagement with the protector.

Preferably, the wire harness described above is configured as follows. The fixing member includes a band to be wound around an outer periphery of the plurality of electric wires.

Bundling the plurality of electric wires with the band results in attaching the fixing member to the electric wires.

Since an operation of bundling the electric wires with the band is easier than the operation of wrapping the tape around the electric wires, a time required for the operation can be shortened. Bundling the electric wires with the band results in attaching the fixing member to the electric wires. Accordingly, there is no risk that a fixing force might deteriorate due to a decrease in an adhesive force, which risk would occur in, for example, a tape. This can improve durability of the wire harness.

In the wire harness described above, it is preferable that the protector-attached portion is positioned only at one side of the electric wires when seen in a longitudinal direction of the electric wires.

Accordingly, when a force is applied to the electric wires, the fixing member leans obliquely relative to the electric wires. As a result, the fixing member bites into the outer periphery of the electric wires, which can increase an anchoring force anchoring the fixing member and the electric wires to each other.

In the wire harness described above, it is preferable that the protector has a substantially U-like cross-sectional shape in a plane perpendicular to a longitudinal direction of the electric wires.

This enables the electric wires to be housed inside the protector.

Preferably, the wire harness described above is configured as follows. The engaging portion is provided in a bottom surface of the U-like shape of the protector. The protector has a notch formed in at least either one of the opposite side walls of the U-like shape. The notch is provided near the engaging portion.

This makes it less likely that an operator's finger interferes with the protector in the vicinity of the engaging portion. Accordingly, workability of the operation of bringing the fixing member into engagement with the engaging portion of the protector is improved.

Preferably, the wire harness described above includes a plurality of protectors and a corrugated pipe that is arranged between the plurality of protectors and houses the electric wires therein.

This enables a portion of the electric wires located between the protectors to be protected with the corrugated pipe. Entirely covering the electric wires with a single protector would deprive the wire harness of flexibility. Providing the plurality of protectors to the wire harness as described above is able to give flexibility to a portion between the protectors (a portion corresponding to the corrugated pipe). This provides improved assembly of the wire harness to a vehicle or the like.

In the wire harness described above, it is preferable that the protector includes a corrugated pipe engaging portion that is engageable with corrugation formed in an outer periphery of the corrugated pipe.

Engagement of the corrugated pipe engaging portion with the corrugated pipe enables the corrugated pipe to be fixed so as not to move relative to the protector.

In the wire harness described above, it is preferable that the protector-attached portion and the engaging portion are configured so as not to be engageable with each other when they are arranged in an abnormal manner.

Accordingly, an attempt to attach the fixing member to an incorrect attaching position is failed. This leads to prevention of erroneous assembling.

In another aspect of the present invention, a method for manufacturing a wire harness is provided as follows. The wire harness manufactured by the manufacturing method includes a plurality of electric wires, a protector, and a fixing member. The protector defines at least either one of a bending shape and a branching shape of the plurality of electric wires. The fixing member includes a bundling portion that bundles the plurality of electric wires and a protector-attached portion that is to be attached to the protector. The manufacturing method includes a bundling step and a protector mounting step. The bundling step includes bundling, at a predetermined position, the plurality of electric wires by the bundling portion, to attach the fixing member to the electric wire. The protector mounting step includes mounting, to the protector, the protector-attached portion of the fixing member attached to the electric wires.

The wire harness having a predetermined shape is formed by bundling the plurality of electric wires with the fixing member and attaching the fixing member to the protector. This manufacturing method, which does not need an operation of wrapping a tape for bundling the electric wires, achieves an improved efficiency of production. Since the dimension of each part of the wire harness is determined by the protector, an improved accuracy of the dimension is also achieved.

In the method for manufacturing the wire harness described above, it is preferable that, in the bundling step, a plurality of bundle units each including the plurality of electric wires are arranged side by side in a predetermined direction, and each of the plurality of bundle units is, at a predetermined position, bundled by the bundling portion of the fixing member.

Arranging the bundle units side by side in the predetermined direction enables an operator to sequentially bundle the bundle units merely by moving in the predetermined direction. Since the path of motion of the operator is simple, paths of motion of a plurality of operators concurrently performing operations are not likely to be tangled, which results in that the operation is performed efficiently. Additionally, since the bundle units are arranged side by side, the bundle units are substantially in parallel with one another. This allows the operator to take almost the same posture each time he/she performs the operation of bundling the bundle unit with the fixing member. This improves efficiency of the operation.

In the method for manufacturing the wire harness described above, it is preferable that, in the bundling step, a workbench including a jig is used. The jig holds each of the plurality of bundle units in such a manner that the plurality of bundle units are arranged side by side in a predetermined direction.

The operator performs the operation of attaching the fixing member on the workbench, and thereby the operation of the bundling step can be performed efficiently. The size of the workbench may be as small as it allows the bundle units to be arranged side by side. Therefore, downsizing is enabled as compared with the conventional workbench.

In the method for manufacturing the wire harness described above, it is preferable that the workbench at least includes: a connector holding jig that holds a connector in a predetermined position, the connector being provided at a terminal of the electric wires included in the bundle unit; and a bundling position index jig that indicates a position where the fixing member is to be attached to the bundle unit.

Use of the workbench enables the fixing member to be attached in a position that is at a predetermined distance from the connector.

It is preferable that, in the workbench, the connector holding jig holds a plurality of the connectors arranged in a line.

Since the positions where the plurality of connectors are held are arranged in a line, the operation of laying the electric wires on the workbench is easy.

It is preferable that the connector holding jig described above includes a plurality of coupled sub-jigs, each of the sub-jigs holding one or more connectors arranged side by side, the connector holding jig being removable from the workbench.

Since the plurality of connectors are held in the connector holding jig, the plurality of connectors (and the electric wires connected to them) can be collectively set on the workbench. When the connector holding jig is divided into the plurality of sub-jigs, the connectors can be handled collectively on a sub-jig basis.

Preferably, the method for manufacturing the wire harness described above includes the following sub-jig arranging step. The sub-jig arranging step includes, subsequent to completion of the bundling step, removing the connector holding jig holding the connectors therein from the workbench, releasing the coupling of the connector holding jig to divide the connector holding jig into a plurality of the sub-jigs, and arranging the sub-jigs on a protector mounting table. In the protector mounting step, an operation of mounting the protector is performed in a state where the sub-jigs are arranged on the protector mounting table.

The coupling of the connector holding jig is released and divided into the sub-jigs, and the sub-jigs are arranged on the protector mounting table. This enables the connectors to be arranged in positions suitable for mounting of the protectors. Since a plurality of connectors can be handled collectively on the basis of the sub-jigs, the connectors and the electric wires can be efficiently arranged on the protector mounting table.

BRIEF DESCRIPTION OF THE DRAWINGS

FIG. 7 Plan views showing a structure of mounting a corrugated pipe to the protector.

FIG. 10 Diagrams for illustration of deformation of the cable tie cased when a force pulling the electric wire is applied.

EMBODIMENT FOR CARRYING OUT THE INVENTION

Figure 1:
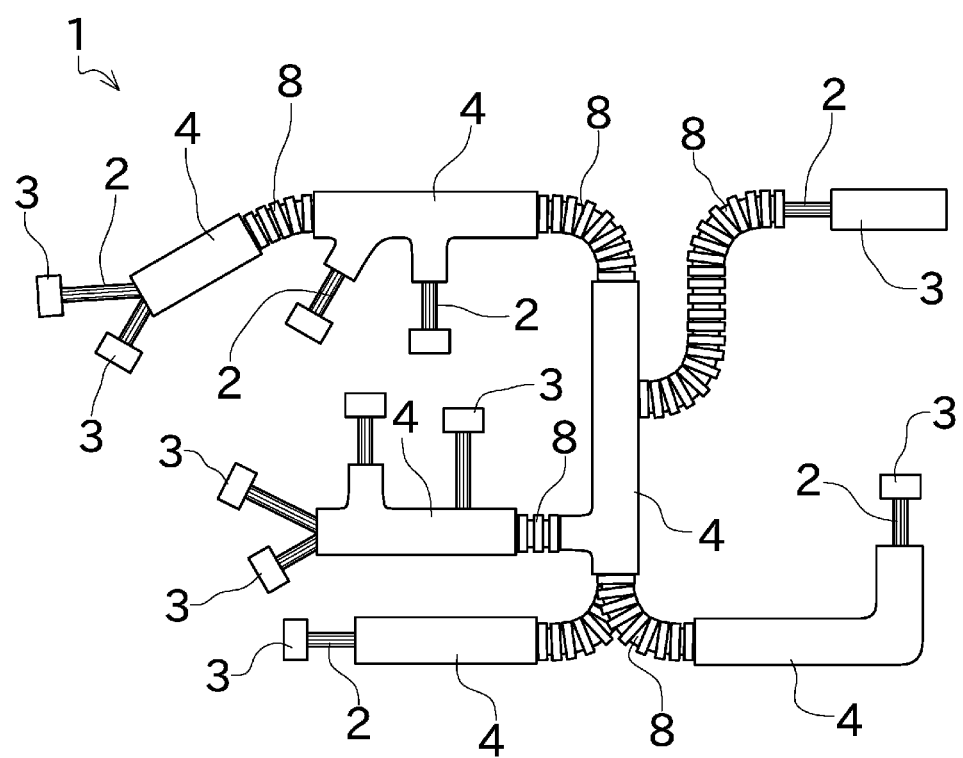
FIG. 1 A plan view schematically showing an example of a wire harness manufactured by a manufacturing method according to an embodiment of the present invention.

An embodiment of the present invention will be described with reference to the drawings. FIG. 1 is a plan view showing an outline of an example of a wire harness 1 according to this embodiment. The wire harness 1 of this embodiment is a wire harness for use in an automobile, and wired in a vehicle body of the automobile. The wire harness 1 is used for power supply to various electrical devices provided in the automobile, communication among the electrical devices, and the like.

The wire harness 1 includes a bundle of a plurality of electric wires 2. Connectors 3 connected to the various electrical devices are arranged at the terminals of the electric wires 2, respectively. Each of the electric wires 2 is wired into a predetermined bending shape. The wire harness 1 as a whole has a complicated branching structure (branching shape).

Protectors 4 are arranged in various portions of the wire harness 1. An exemplary configuration of the protector 4 is shown in FIGS. 2 to 4.

Figure 2:
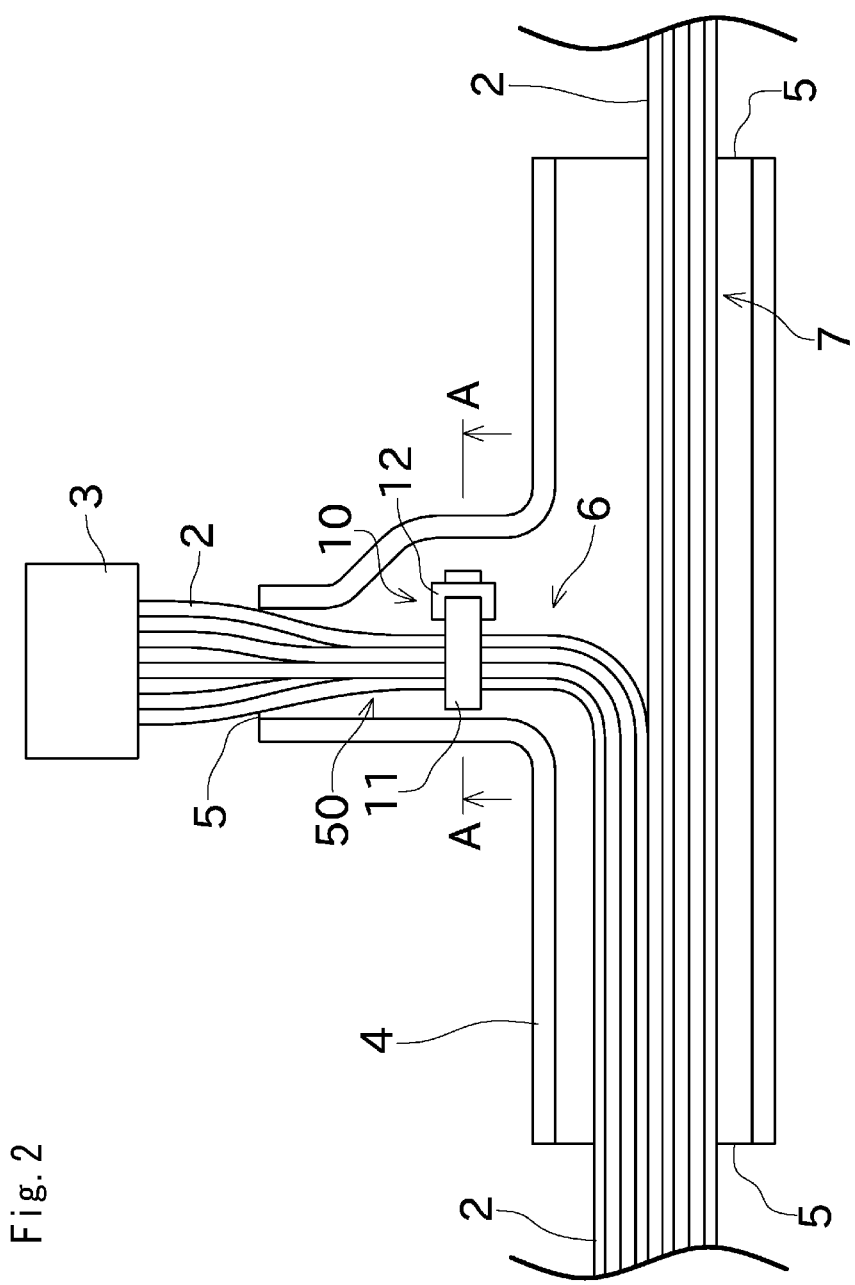
FIG. 2 A plan view showing the inside of a protector.

As shown in FIG. 2, the protector 4 houses a plurality of electric wires 2 therein. More specifically, as shown in FIG. 3, the protector 4 has a substantially U-like shape when seen in a cross-section perpendicular to the longitudinal axis of the electric wires 2 housed in the protector 4. That is, in the cross-sectional view, the protector 4 includes a bottom surface and a pair of side walls that extend from the bottom surface in a direction substantially perpendicular to the bottom surface. The protector 4 is able to house a plurality of electric wires 2 within the inside of the U-like shape.

Figure 3:
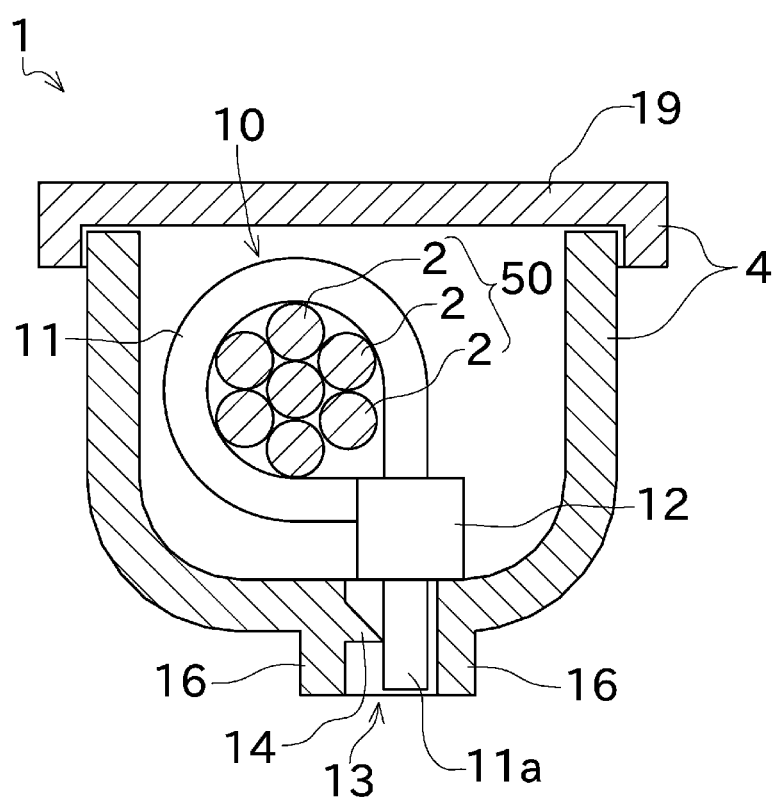
FIG. 3 A cross-sectional view taken along the line A-A and viewed along the arrows of FIG. 2.
Figure 4:
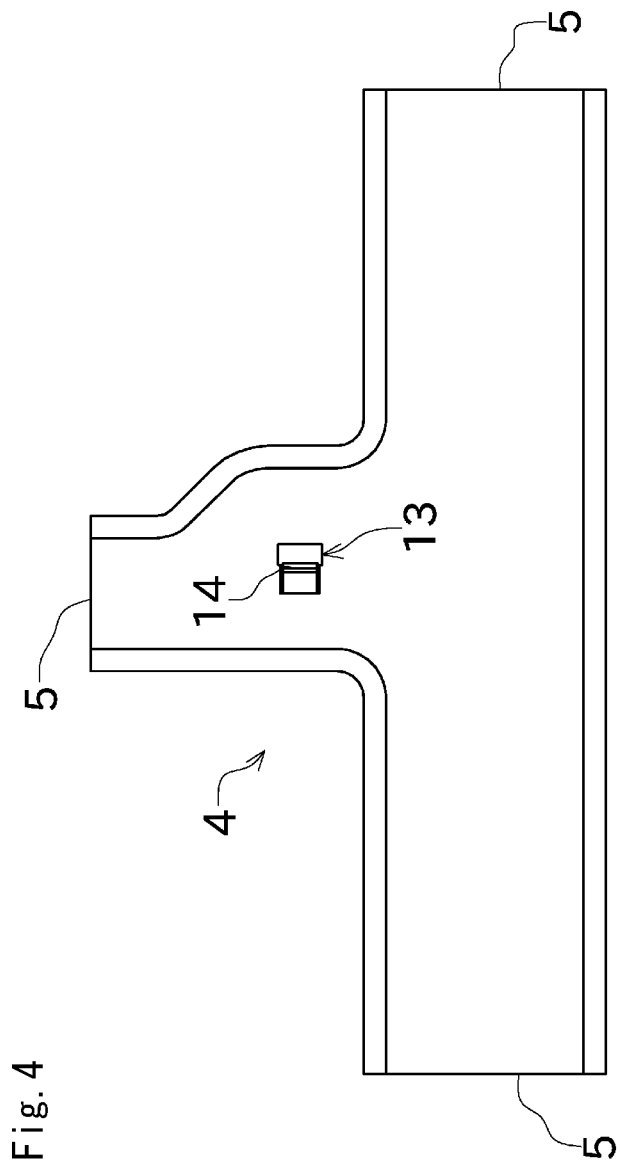
FIG. 4 A plan view of the protector.

As shown in FIG. 3, the protector 4 includes a lid 19 that closes an open end of the U-like shape. This prevents the electric wires 2 housed in the protector 4 from protruding out of the U-like shape from the open end. The lid 19 is, however, not an essential component of the protector 4, and may be omitted. In the following descriptions and drawings, illustration of the lid 19 may sometimes be omitted.

In the conventional wire harness, the tapes are wrapped around the electric wires, thereby fixing the bending and branching shape of the electric wires, to form a wire harness having a predetermined shape. In the wire harness 1 of this embodiment, on the other hand, the electric wires 2 are housed in the protectors 4, thereby fixing the bending and branching shape of the electric wires 2.

For example, the protector 4 illustrated in FIGS. 2 and 4 has three electric wire extraction openings 5. As shown in FIG. 2, the plurality of electric wires 2 housed in the protector 4 are branched into two groups in the protector 4, and the two groups are extracted out of the protector 4 through different electric wire extraction openings 5. One (first electric wire group 6) of the branched electric wire groups is bent at about 90 degrees in the protector 4, and extracted from the protector 4. The other electric wire group (second electric wire group 7) extends substantially linearly in the protector 4 and is extracted out of the protector 4.

Thus, the protector 4 of this embodiment has a function of defining the bending shape and the branching shape of the electric wires 2. Therefore, housing the electric wires 2 in the protector 4 results in formation of the wire harness 1 having a predetermined bending shape and a predetermined branching shape. the shape of the protector 4 is not limited to the one shown in FIGS. 2 to 4. Protectors 4 having various shapes are adoptable in accordance with the bending or branching shape of each part of the wire harness 1, as shown in FIG. 1. The material of the protector 4 is not particularly limited, but a lightweight material that is easy to shape and has a certain level of rigidity is preferred. In this embodiment, the protector 4 is made of a plastic.

As shown in FIGS. 2 and 3, a cable tie (fixing member) 10 that bundles the electric wires 2 is attached to the plurality of electric wires 2 housed in the protector 4. The cable tie 10 has a known configuration including a band (bundling portion) 11 and a buckle 12. In the cable tie 10 of the type shown in FIG. 3, the band 11 and the buckle 12 are integrally formed. As shown in FIG. 3, the band 11 is wound around the plurality of electric wires 2, and a distal portion 11a of the band 11 is inserted through the buckle 12, thereby bundling the plurality of electric wires 2. A lock mechanism (not shown) is provided in the buckle 12 so as to prevent the tightening of the electric wires 2 by the band 11 from being loosened. In the following description, a plurality of electric wires 2 bundled by one cable tie 10 may be called "bundle unit 50".

Figure 5:
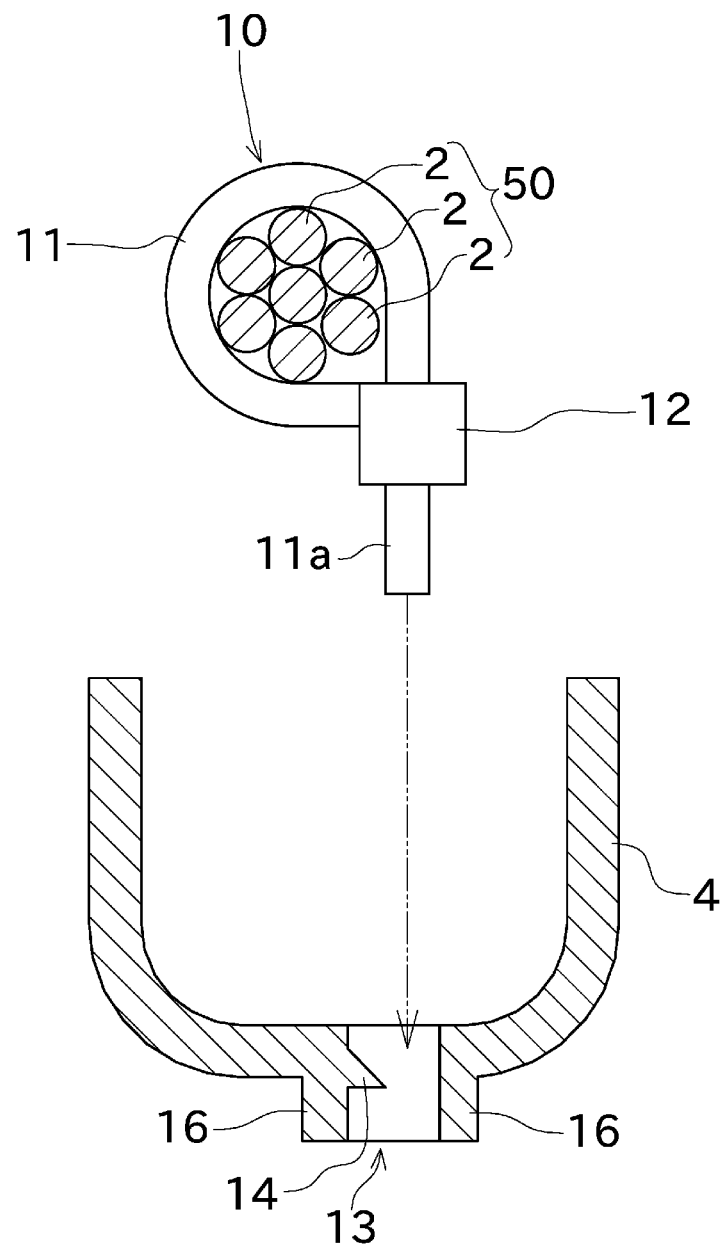
FIG. 5 A cross-sectional view showing a situation of attaching a cable tie to the protector.
Figure 6:
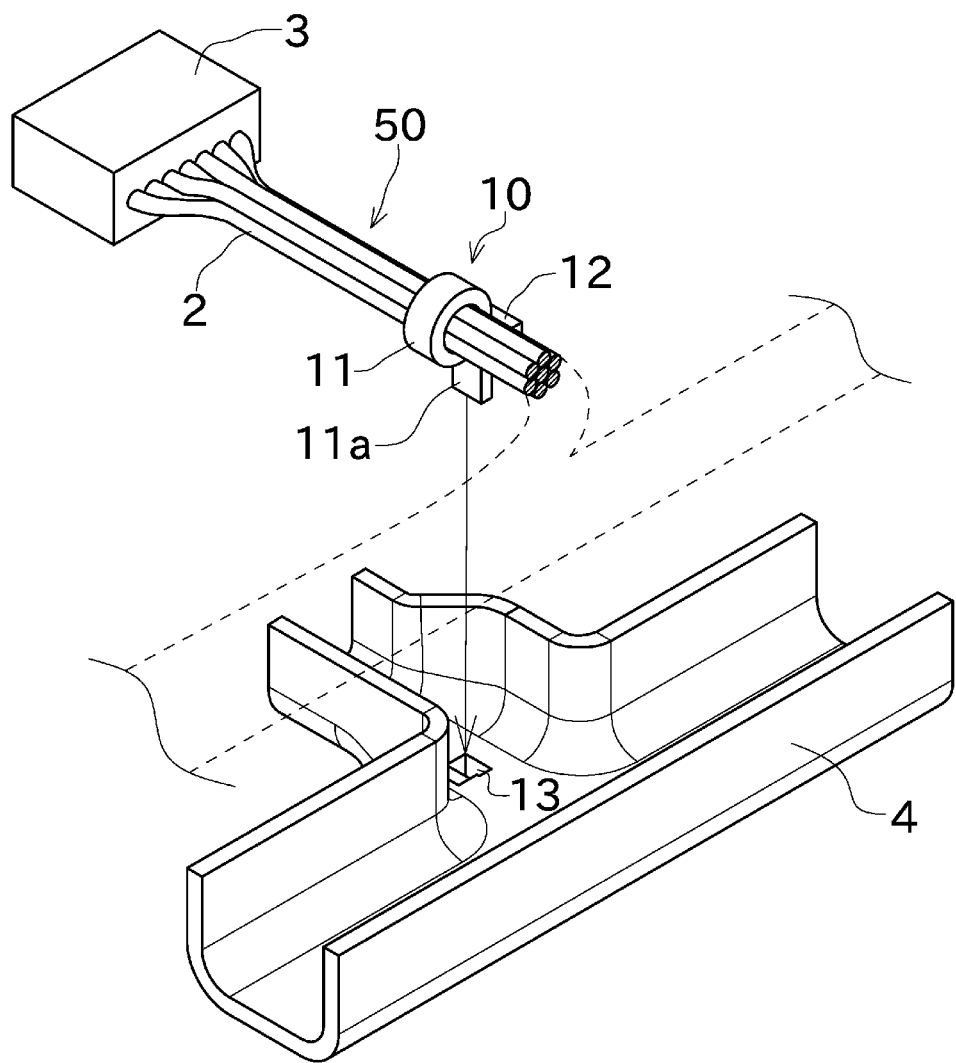
FIG. 6 A perspective view showing the situation of attaching the cable tie to the protector.

As shown in FIGS. 4 to 6, an engaging portion 13 configured for engagement with the cable tie 10 is provided in an appropriate position in the protector 4. More specifically, the engaging portion 13 is configured as a hole configured to receive the band 11 of the cable tie 10. A locking pawl 14 engageable with the band 11 is provided in the hole. The engaging portion 13 of this embodiment is provided in the bottom surface of the protector 4 having a U-like cross-sectional shape.

As shown in FIG. 5, the band 11 that bundles the plurality of electric wires 2 (bundle unit 50) is inserted through the buckle 12, so that the distal portion 11a of the band 11 protrudes from the buckle. In this condition, the distal portion 11a of the band 11 is inserted into the engaging portion 13, and the locking pawl 14 is engaged with the distal portion 11a, as shown in FIGS. 5 and 6 (the state shown in FIG. 3). As a result, the cable tie 10 is fixed to the protector 4. This can settle the positions of the electric wires 2 (bundle unit 50) bundled by the cable tie 10 and the protector 4 relative to each other. Since the engagement of the distal portion 11a of the band 11 with the engaging portion 13 results in attachment of the cable tie 10 to the protector 4, the distal portion 11a of the band 11 can be considered as a protector-attached portion.

As shown in FIGS. 3 and 5, the engaging portion 13 of this embodiment is configured as a through hole extending through the bottom surface of the protector 4. Therefore, the distal portion 11a of the band 11 (the protector-attached portion) inserted into the engaging portion 13 extends through the bottom surface of the protector 4 and protrudes outward. This is why the protector 4 of this embodiment includes a protective wall 16 that is provided so as to surround an edge portion of the engaging portion 13 configured as a through hole. The protective wall 16 has a rib-like shape protruding toward the side opposite to where the electric wires 2 are housed. The protective wall 16 protects the distal portion 11a of the band 11 (protector-attached portion) inserted in the engaging portion 13 from contact with other members. Accordingly, occurrence of disengagement of the distal portion 11a from the engaging portion 13 caused by a force applied thereto can be prevented.

Some conventional wire harness has also employed a protector 104 as an exterior component of the electric wire 2. In such a conventional wire harness, as shown in FIG. 8, a tape 101 is wrapped around the electric wire 2 and the protector 104, to fix them.

Figure 8:
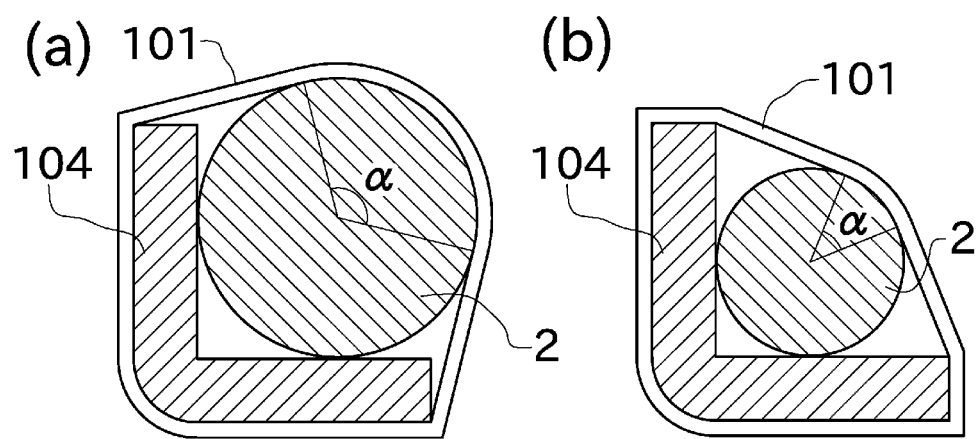
FIG. 8 Cross-sectional views showing a structure of attaching an electric wire to a protector in a conventional wire harness.

Referring to FIG. 8, such a conventional manner of fixing makes the electric wire 2 and the tape 101 be in contact with each other with an angle α as seen in a cross-section perpendicular to the longitudinal axis of the electric wire 2. When the electric wire 2 has a large diameter as illustrated in FIG. 8(*a*), the electric wire 2 and the tape 101 are in contact with each other with a sufficiently large contact angle α, which enables the electric wire 2 to be fixed to the protector 104 with a sufficient anchoring force. When the outer shape of the electric wire 2 is thin as illustrated in FIG. 8(*b*), the contact angle α between the tape 101 and the electric wire 2 is small, which results in an insufficient anchoring force for anchoring the electric wire 2 to the protector 104. Therefore, the conventional wire harness in which the protector 104 and the electric wire 2 are fixed to each other with the tape 101 involves a problem that the anchoring force is unstable depending on the diameter of the electric wire 2.

Figure 9:
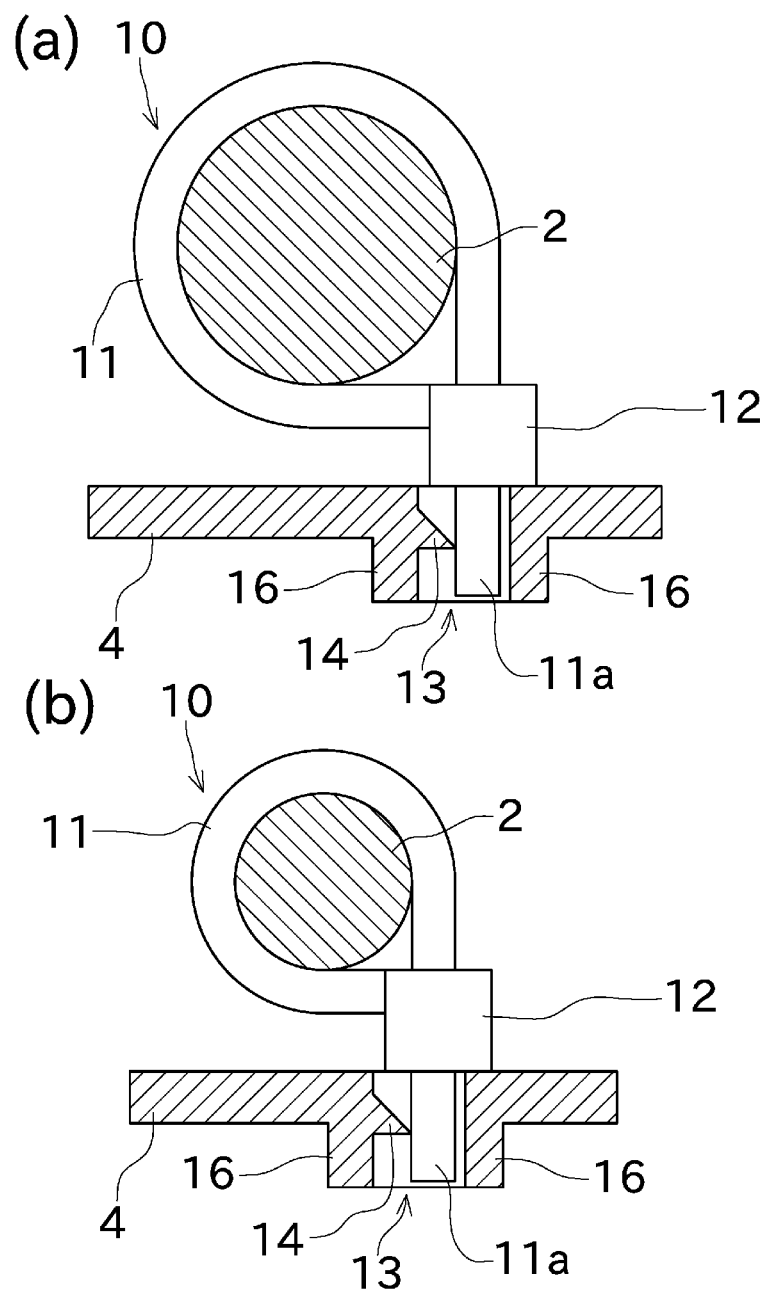
FIG. 9 Cross-sectional views showing a structure of attaching an electric wire to the protector of this embodiment.

In this embodiment, on the other hand, the cable tie 10 is wound around the electric wires 2, and thus the cable tie 10 is in contact with the electric wires 2 substantially throughout the outer periphery of the electric wires 2. Therefore, the cable tie 10 is able to be in tight contact with the outer periphery of the electric wires 2 over a wide contact area, in either of the cases of the electric wire 2 with a large diameter as illustrated in FIG. 9(*a*) or the electric wire that is thin as illustrated in FIG. 9(*b*). Such a configuration of this embodiment is able to provide a stable anchoring force for anchoring the electric wires 2 to the protector 4 irrespective of the diameter of the electric wires 2.

Referring to FIG. 10(*a*), when the cable tie 10 is seen in the direction of the longitudinal axis of the electric wires 2, the protector-attached portion (distal portion 11a of the band 11) is positioned at one side of the electric wires 2. In other words, when seen in the direction of the longitudinal axis of the electric wires 2, there are not two or more protector-attached portions arranged with the electric wires 2 therebetween. The cable tie 10 has a certain degree of flexibility. When a force pulling the electric wires 2 in the direction of their longitudinal axis is applied to the wire harness 1, the cable tie 10 is pulled by the electric wires 2. This makes the band 11 oblique relative to the longitudinal axis of the electric wires 2 as shown in FIG. 10(*b*). As a result, the band 11 bites into the outer periphery of the electric wires 2, which increases the anchoring force anchoring the electric wires 2 and the cable tie 10 to each other. Accordingly, even when a force pulling the electric wires 2 is applied to the wire harness 1, the position of the electric wires 2 is not easily displaced relative to the protector 4.

Thus, the configuration of this embodiment is able to ensure the fixing of the electric wires 2 to the protector 4, as compared with the conventional configuration in which a protector and electric wires are fixed to each other with a tape.

Referring to FIG. 1, in the wire harness 1 of this embodiment, the corrugated pipe 8 is arranged between the protectors 4 as appropriate. Arranging the corrugated pipe 8 between the protectors 4 provides protection of the electric wires 2 at a location between the protectors 4. In addition, the wire harness 1 is, in its portion corresponding to the corrugated pipe 8, deformable flexibly to some extent. This makes it easy to assemble the wire harness 1 to a vehicle body of an automobile.

As shown in FIG. 7(*a*), the protector 4 in which the corrugated pipe 8 is arranged is provided with a corrugated pipe engaging portion 15. The corrugated pipe engaging portion 15 has a rib-like shape protruding inward of the protector 4, and is engaged with recesses formed in an outer periphery of the corrugated pipe 8 as shown in FIG. 7(*b*). This fixes the corrugated pipe 8 with prevention of its movement relative to the protector 4. For example, the corrugated pipe 8 arranged between two protectors 4 as illustrated in FIG. 7(*b*) is able to fix the right-hand protector 4 and the left-hand protector 4 with prevention of their movement relative to the corrugated pipe 8. Accordingly, the left-hand protector 4 and the right-hand protector 4 illustrated in FIG. 7(*b*) can be kept at a constant distance from each other.

Next, a method for manufacturing the wire harness 1 of this embodiment will be described.

Figure 11:
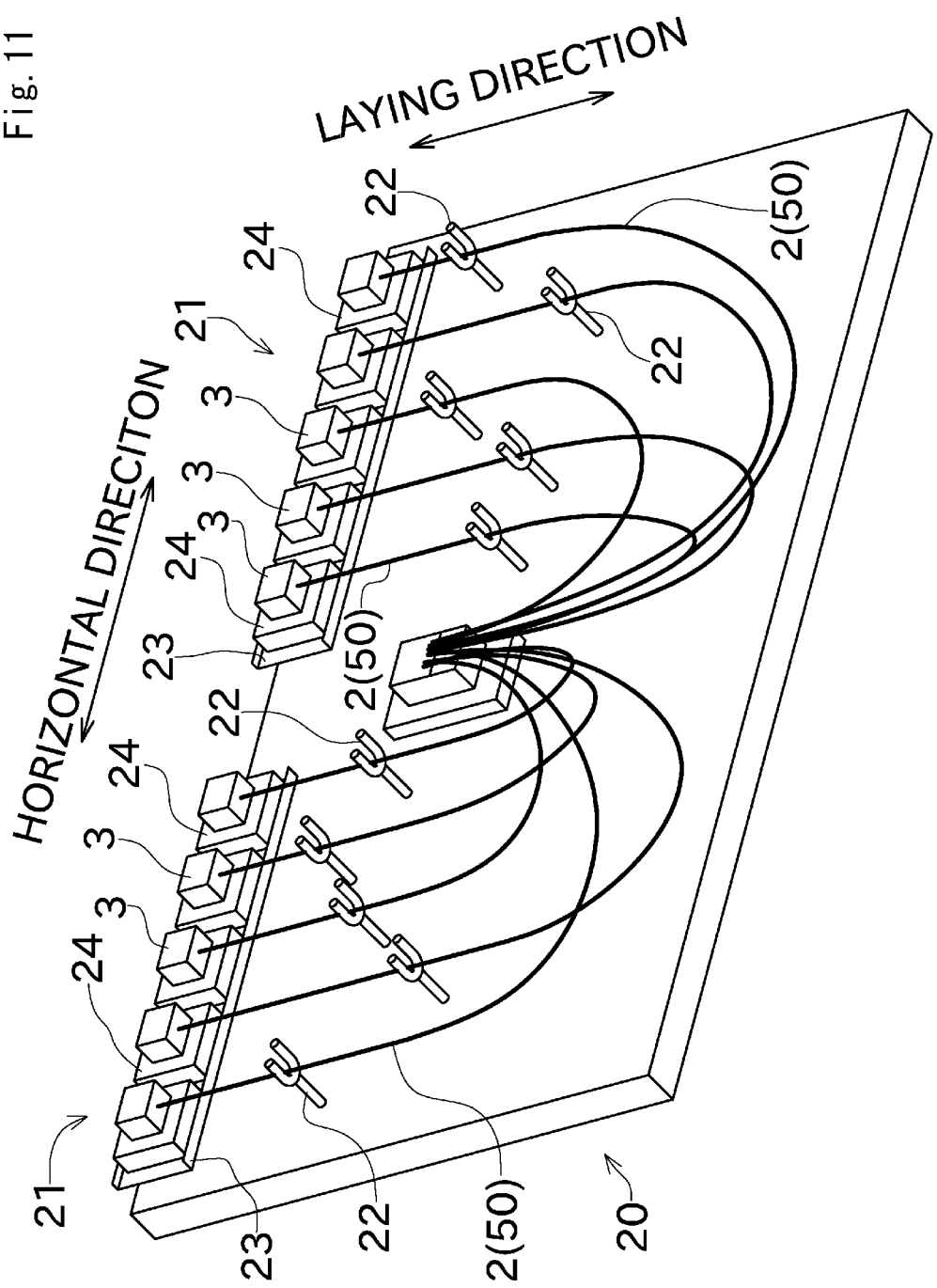
FIG. 11 A perspective view of a workbench adopted for the manufacturing method according to this embodiment.

FIG. 11 is a perspective view schematically showing a workbench (ASSY board) 20 adopted in the manufacturing method of this embodiment. In the state shown in FIG. 11, a plurality of electric wires 2 are laid on the workbench 20. In FIG. 11, for convenience of illustration, the bundle unit 50 including the plurality of electric wires 2 is illustrated as a single thick line. As shown in FIG. 11, the workbench 20 of this embodiment includes connector holding jigs 21 and a plurality of bundling position index jigs 22. FIG. 11 is a plan view showing a region near the connector holding jig 21 and the bundling position index jigs 22 on an enlarged scale.

The connector holding jig 21 includes a plurality of connector holders 24 that hold the connectors 3, which are arranged at the terminals of the electric wires 2, in predetermined positions.

As shown in FIG. 11, the connector holding jig 21 includes a connector beam 23. The connector beam 23 is a beam-like member elongated in a horizontal direction. The connector holder 24 mentioned above comprises a plurality of the connector holders 24 arranged side by side longitudinally along the connector beam 23. Thus, the connector holding jig 21 provided on the workbench 20 of this embodiment is able to hold a number of connectors 3 arranged side by side in the horizontal direction.

Figure 13:
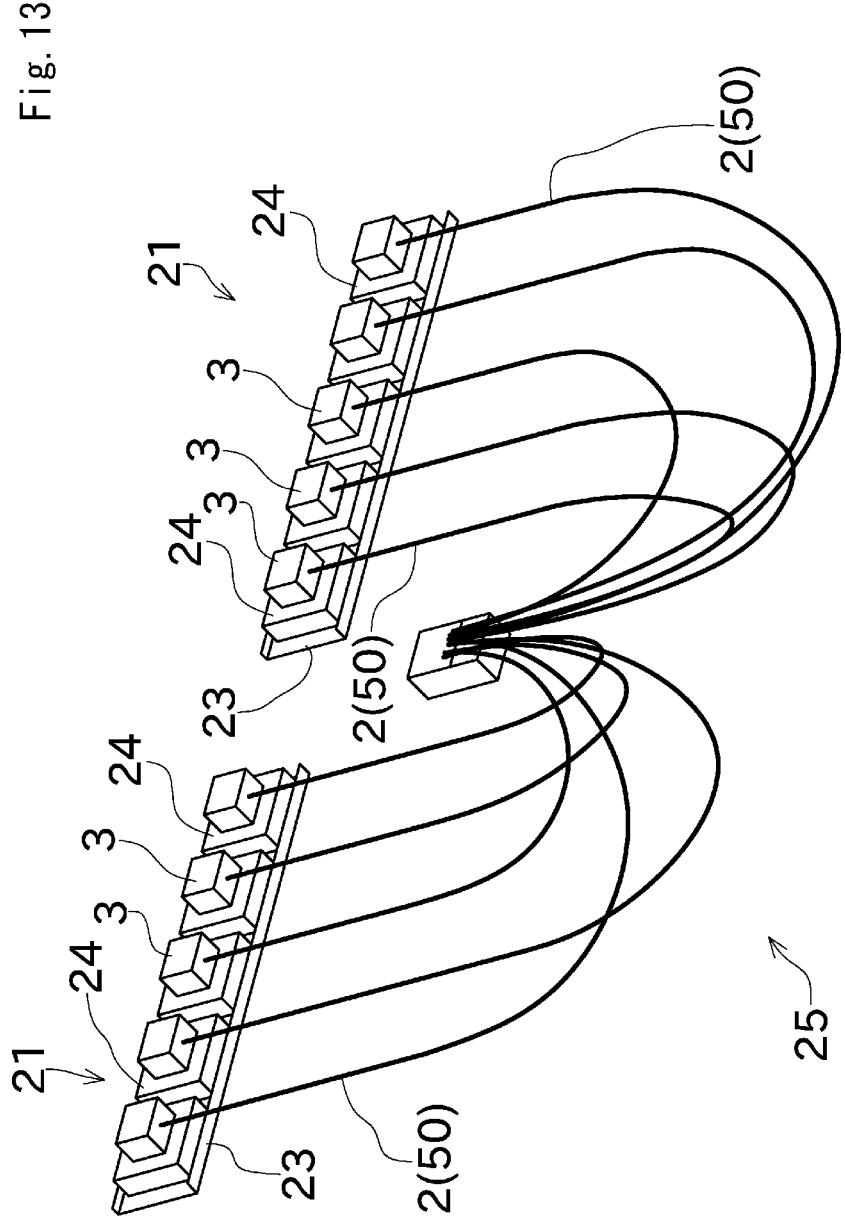
FIG. 13 A perspective view of a connector-beam-integrated electric wire group.
Figure 14:
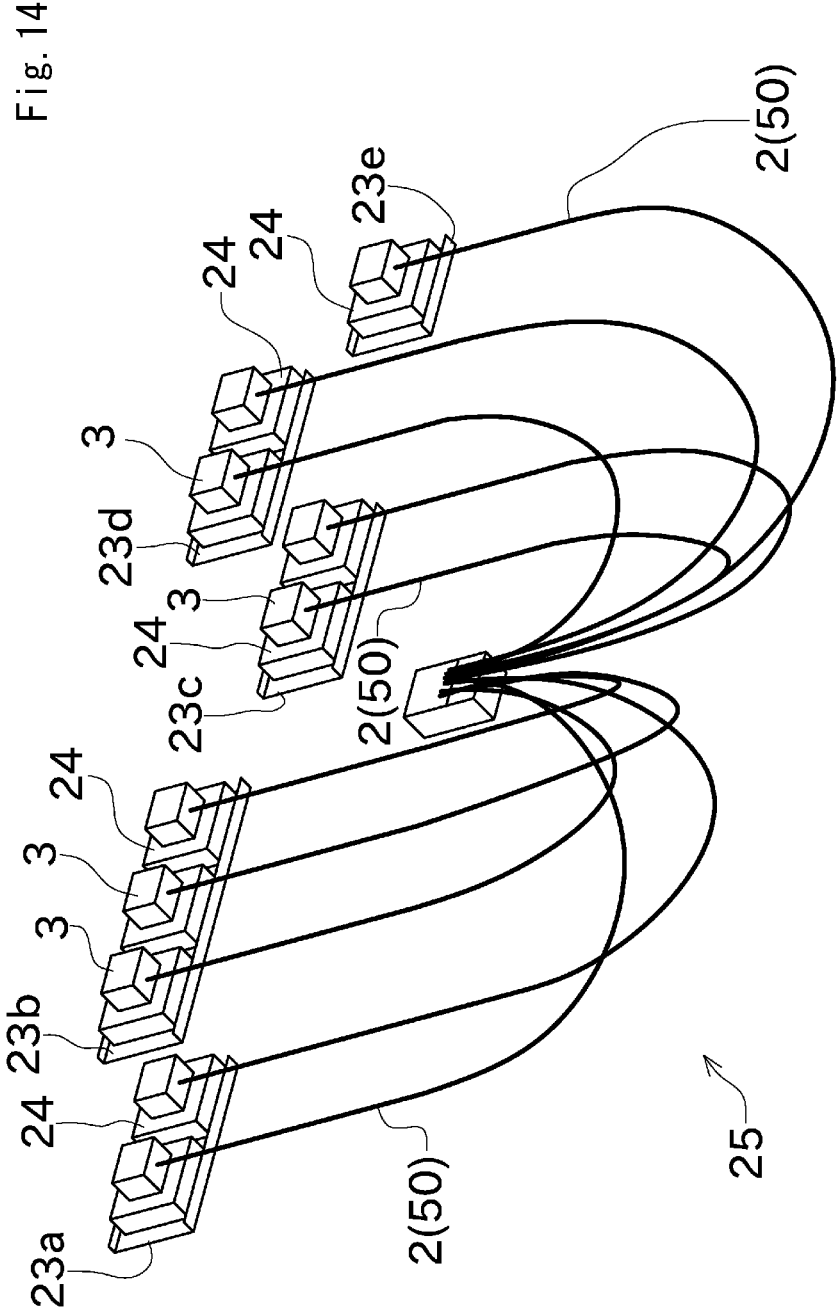
FIG. 14 A perspective view showing a situation where a connector holding jig is divided into a plurality of sub-beams.

As shown in FIG. 13, the connector beam 23 is removable from the workbench 20. As shown in FIG. 14, the connector beam 23 can be divided across the longitudinal axis thereof, into a plurality of sub-beams (sub-jigs) 23*a*, 23*b*, . . . . Each of the sub-beams 23*a*, 23*b*, . . . , includes one or more connector holders 24 (that is, one sub-beam is able to hold one or more connectors 3). Each one of the sub-beams can be coupled to and decoupled from another sub-beam. The connector beam 23 shown in FIG. 13 is formed by coupling the plurality of sub-beams 23*a*, 23*b*, . . . , arranged in a line.

The workbench 20 of this embodiment is arranged while extending (standing) in the substantially vertical direction. Therefore, the electric wires 2 hang down in the substantially vertical direction from the connectors 3 held by the connector holding jig 21.

Figure 15:
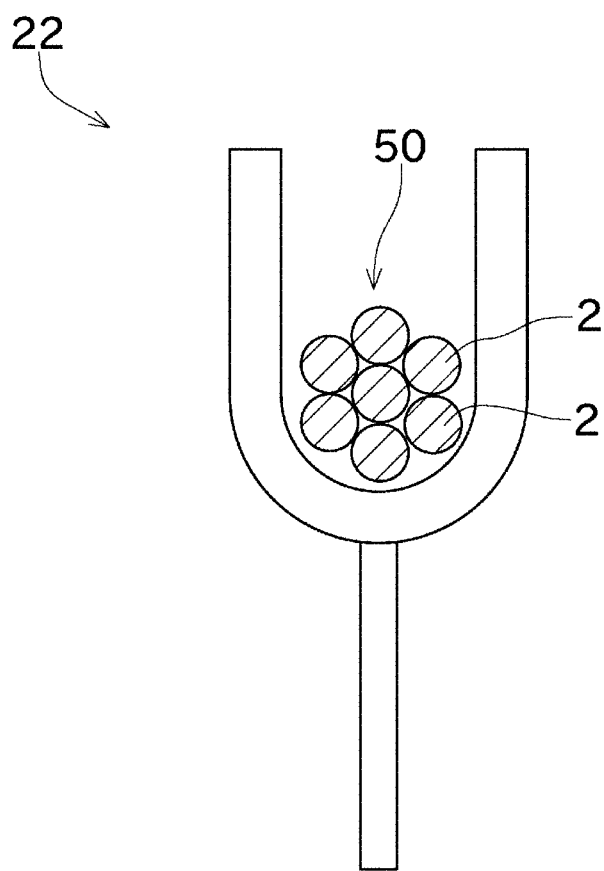
FIG. 15 A front elevational view of a bundling position index jig.

The bundling position index jig 22 is provided for each bundle unit 50. The bundling position index jig 22 is, for example, a substantially U-like jig in the shape of a tuning fork, as shown in FIG. 15. The bundling position index jig 22 holds a plurality of electric wires 2 (bundle unit 50) by receiving the electric wires 2 within the inside of the U-like shape as shown in FIG. 15. Holding the electric wires 2 on a bundle unit 50 basis by the bundling position index jig 22 provides restriction of a route through which the electric wires 2 are laid.

The bundling position index jig 22 is arranged on the lower side of the connector holder 24 with respect to the substantially vertical direction. The electric wires 2 hanging down from the connector 3 held in the connector holder 24 are, on a bundle unit 50 basis, passed through the bundling position index jig 22, and thereby the bundle unit 50 can be laid in the substantially vertical direction (the direction perpendicular to the longitudinal direction of the connector beam 23, i.e., the direction perpendicular to the horizontal direction) at a location between the connector 3 and the bundling position index jig 22.

As described so far, the bundling position index jig 22 holds the bundle unit 50 with the longitudinal axis thereof extending in the substantially vertical direction (in the direction perpendicular to the longitudinal direction of the connector beam 23). Since the workbench 20 includes a plurality of the bundling position index jigs 22, a plurality of the bundle units 50 are laid substantially in parallel with one another on the workbench 20. Accordingly, as shown in FIG. 11, the workbench 20 of this embodiment is able to lay thereon the plurality of bundle units 50 arranged side by side in the substantially horizontal direction (the longitudinal direction of the connector beam 23). The longitudinal direction of the bundle unit 50 held by the bundling position index jig 22 will be called a laying direction in which laying is made on the workbench 20 of this embodiment.

Figure 12:
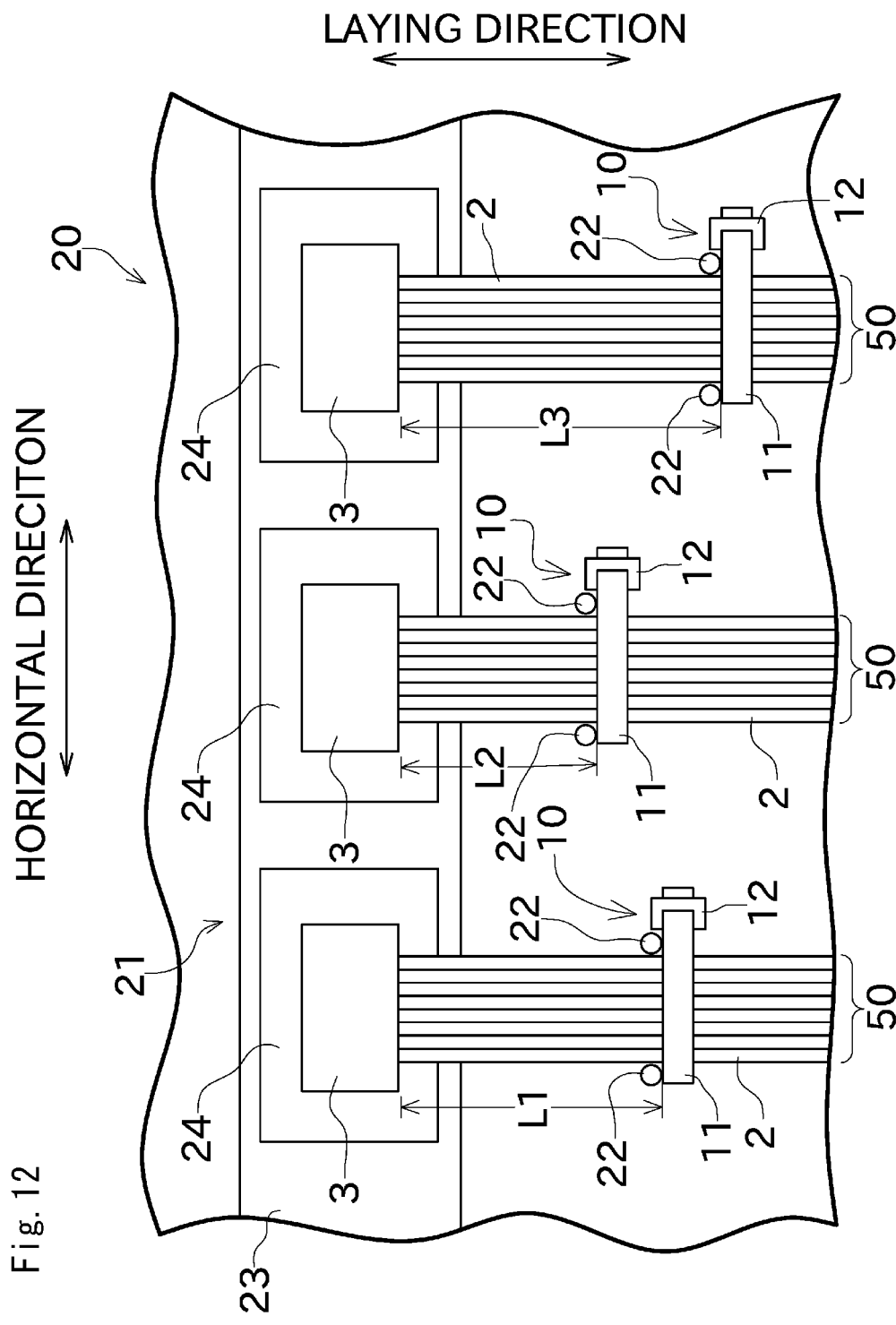
FIG. 12 A plan view showing the workbench on an enlarged scale.

The bundling position index jig 22 serves also to indicate to an operator where to attach the cable tie 10. To be more specific, as shown in FIG. 12, the operator arranges the cable tie 10 so as to follow each bundling position index jig 22, and bundles the plurality of electric wires 2 included in each bundle unit 50 with the cable tie 10. Accordingly, the operator is able to attach the cable tie 10 in a position indicated by the bundling position index jig 22.

Each of the bundling position index jigs 22 is arranged at a predetermined distance from the corresponding connector 3. This enables the cable tie 10 attached to the bundle unit 50 to be positioned at a predetermined distance from the connector 3. For example, in the left example in FIG. 12, the cable tie 10 is attached in a position at a distance L1 from the connector 3. Likewise, in the middle and right examples in FIG. 12, the cable ties 10 are attached in positions at distances L2 and L3 from the connector 3, respectively.

Figure 16:
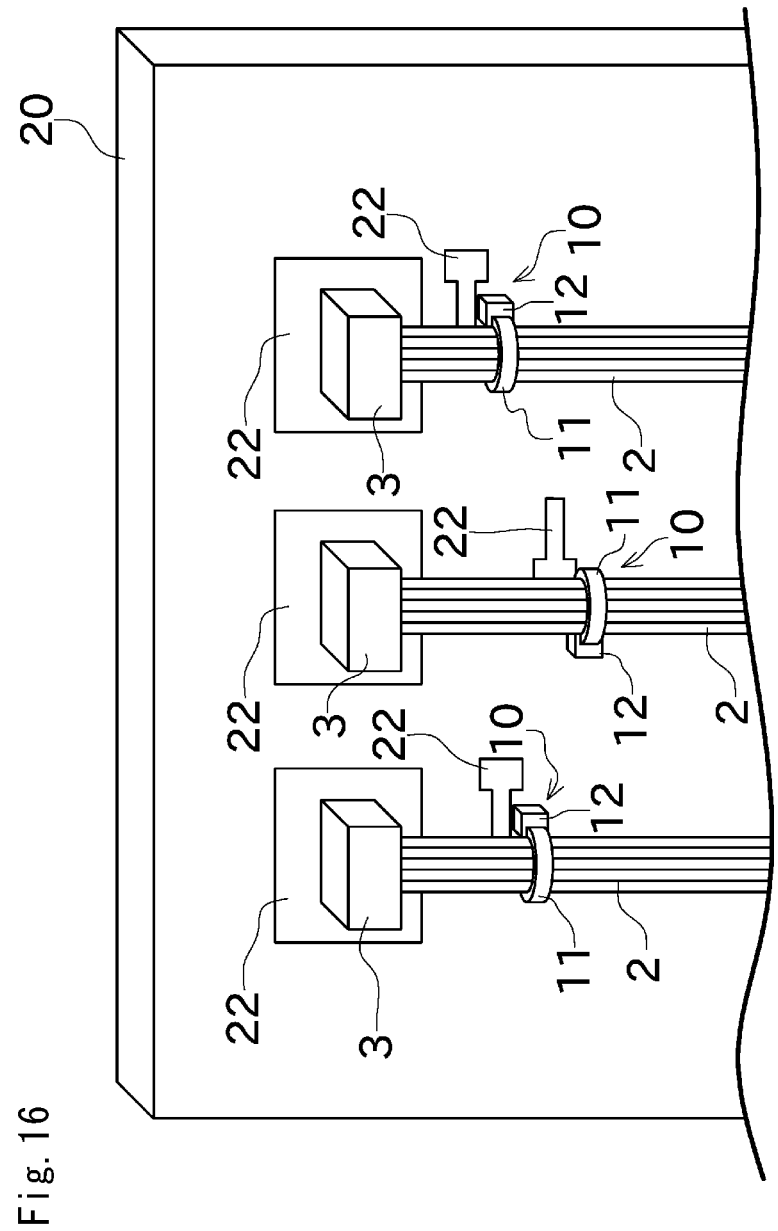
FIG. 16 A diagram showing a variation of the bundling position index jig.

The cable tie 10 of this embodiment is of the type including the band 11 and the buckle 12 integrally formed. Thus, there are two different directions of attaching the cable tie 10 depending on the direction of wrapping the band 11 around the electric wires 2. It is therefore preferred that the bundling position index jig 22 is so shaped as to indicate the direction of attaching the cable tie 10, as shown in FIG. 16.

This enables the operator to attach the cable tie 10 to the electric wire 2 in a correct attaching direction.

Next, an actual flow of the method for manufacturing the wire harness 1 of this embodiment will be described.

Firstly prepared are the connector beam 23 (connector holding jig 21) in which the plurality of sub-beams 23a, 23b, . . . , arranged in a line are coupled, and the plurality of electric wires 2 having the connectors 3 at the terminals thereof. Then, each of the connectors 3 is held in the corresponding connector holder 24 of the connector holding jig 21. Such a state (the state shown in FIG. 13) where the connectors 3 of the respective electric wires are held by the connector holding jigs 21 will be called a connector-beam-integrated electric wire group 25. The connector-beam-integrated electric wire group 25 can be manufactured through a simple process of merely arranging each connector 3 in the connector holding jig 21. Therefore, the connector-beam-integrated electric wire group 25 can be manufactured automatically or semi-automatically by using an appropriate manufacturing apparatus. It is of course acceptable that an operation of manufacturing the connector-beam-integrated electric wire group 25 is performed by human hand.

Then, the operator sets, on the workbench 20, the connector holding jig 21 of the connector-beam-integrated electric wire group 25. Here, a fixing jig ((not shown)) for setting the connector holding jig 21 in a predetermined position is provided on the workbench 20. Thus, the plurality of connectors 3 and electric wires 2 included in the connector-beam-integrated electric wire group 25 can be collectively set on the workbench 20. As mentioned above, the connector holding jig 21 is arranged on the workbench 20 in such a manner that the longitudinal axis of the connector beam 23 extends substantially in the horizontal direction.

Then, the operator passes the electric wires 2 hanging down from each connector 3 through the corresponding bundling position index jig 22 on a bundle unit 50 basis. As a result, the bundle units 50 held in the respective bundling position index jigs 22 arranged side by side in the horizontal direction are substantially in parallel with one another, as shown in FIG. 11.

Then, the operator attaches the cable tie 10 to a position on the bundle unit 50 (the plurality of electric wires 2) held in the bundling position index jig 22, the position being indicated by the bundling position index jig 22 (bundling step). Since the bundle units 50 held by the bundling position index jigs 22 are in parallel with one another as mentioned above, the operator is allowed to take almost the same posture each time he/she performs the operation of attaching the cable tie 10 to the bundle unit 50. This improves workability in the operation.

In this embodiment, as shown in FIG. 11, the bundle units 50 to which the cable ties 10 are to be attached are arranged orderly in the horizontal direction. Accordingly, the operator is able to sequentially attach the cable ties 10 to all the bundle units 50 merely by moving in the horizontal direction. This requires the operator to move through a merely minimal distance, which provides an improved efficiency of operation.

The method for manufacturing the conventional wire harness requires the operator to move around the workbench. Therefore, when a plurality of operators perform operations on a single workbench, paths of motion of the operators are tangled, which leads to a decrease in the efficiency of operation. In the workbench 20 of this embodiment, each operator has only to move in one direction (horizontal direction) to sequentially attach the cable ties 10.

Accordingly, in a case where a plurality of operators arranged side by side perform operations on the workbench 20 of this embodiment, paths of motion of the operators are not tangled if the operators move in the same direction. This enables the plurality of operators to concurrently perform operations on the single workbench 20 in an efficient manner.

Then, the operator removes, from the workbench 20, the connector-beam-integrated electric wire group 25 having the cable ties 10 attached thereto, and then moves the connector-beam-integrated electric wire group 25 to a protector mounting table (not shown). At this time, the operator divides the connector beam 23 of the connector-beam-integrated electric wire group 25 into the plurality of sub-beams 23a, 23b, . . . (into the state shown in FIG. 14), and arranges each of the sub-beams in a predetermined position on the protector mounting table (sub-jig arranging step). In this manner, the connectors 3 and the electric wires 2 are arranged at positions suitable for mounting of the protectors 4.

The operator then mounts a predetermined protector 4 to each of the cable ties 10 that are attached to the electric wires 2 arranged on the protector mounting table (protector mounting step). Since each of the cable ties 10 is attached in a predetermined position on the electric wire 2, mounting the protector 4 to the cable tie 10 results in fixing the protector 4 in an appropriate position on the electric wire 2.

When needed, the operator arranges the corrugated pipe 8 on the electric wire 2, and engages the corrugated pipe 8 with the corrugated pipe engaging portion 15 of the protector 4.

The wire harness 1 having a predetermined shape can be manufactured by mounting the protector 4 to the plurality of electric wires 2 (bundle unit 50) bundled by the cable tie 10 in the above-described manner.

Figure 17:
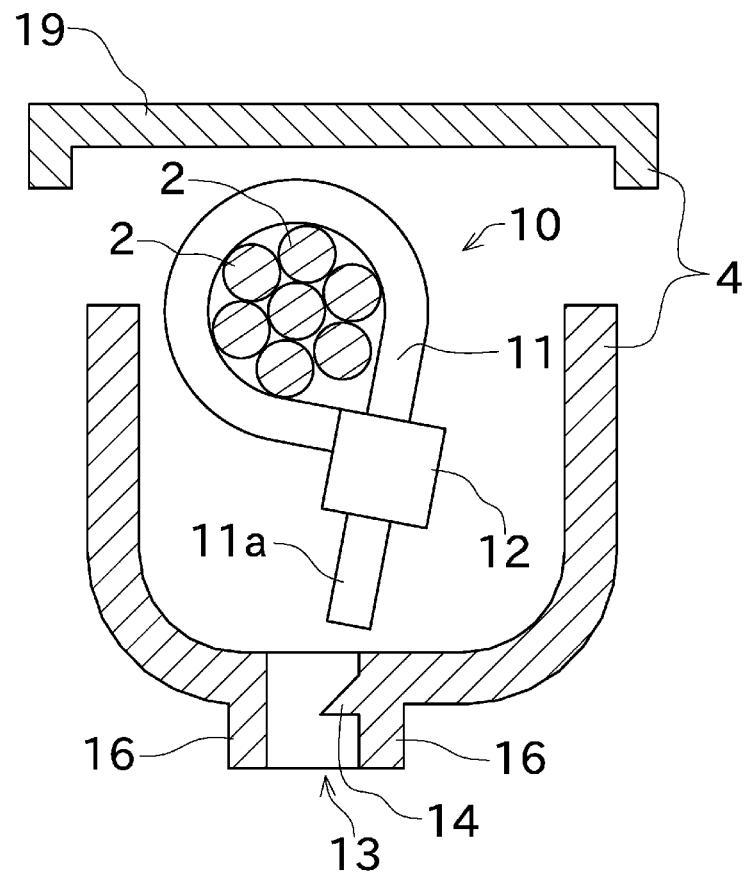
FIG. 17 A cross-sectional view illustrating a case where attaching the cable tie to the protector is impossible.

As shown in FIGS. 3 and 17, the engaging portion 13 of this embodiment has two patterns depending on the direction of providing the protector 4. The engaging portion 13 of each protector 4 is formed in a specified direction. As mentioned above, there are two different directions of attaching the cable tie 10 depending on the direction of wrapping the band 11 around the electric wires 2. That is, the cable tie 10 and the engaging portion 13 have a correct positional relationship or an abnormal (incorrect) positional relationship depending on a combination of the direction of providing the engaging portion 13 and the direction of attaching the cable tie 10.

When the engaging portion 13 and the cable tie 10 have a correct positional relationship as illustrated in FIG. 3, they can be engaged normally. In this case, the electric wires can be completely housed in the protector 4, and therefore the lid 19 can be closed. When the engaging portion 13 and the cable tie 10 have an inverse relationship (abnormal positional relationship) as illustrated in FIG. 17, it is impossible to insert the distal portion 11a of the band 11 into the engaging portion 13. Even if the distal portion 11a was forcibly inserted into the engaging portion 13, the electric wires 2 could not be completely housed in the protector 4, and therefore the lid 19 could not be closed.

Thus, this embodiment is configured such that, when the cable tie 10 has an abnormal positional relationship relative to the protector 4, engagement of them is impossible, which results in the impossibility of housing the electric wires 2 in the protector 4. This can prevent the operator from mistakenly engaging the cable tie 10 with an incorrect protector 4 when assembling the wire harness 1.

Next, differences of the manufacturing method according to this embodiment from the conventional manufacturing method will be described briefly.

In the conventional manufacturing method, a wire harness having a predetermined bending and branching shape is manufactured by laying electric wires on a workbench so as to form a predetermined bending and branching shape and then wrapping tapes around the electric wires. This causes an increase in the size of the workbench, and also includes a less easy operation of wrapping the tapes.

In this respect, in the manufacturing method of this embodiment, after the electric wires 2 are removed from the workbench 20, the protectors 4 are mounted, to thereby fix the bending and branching shape of the electric wires 2. That is, what is required of the workbench 20 of this embodiment is merely allowing the operation of attaching the cable ties 10 to the electric wires 2 to be performed. The workbench 20 need not have a function of enabling the electric wires 2 to be laid in a predetermined bending and branching shape. This embodiment is able to downsize the workbench 20 because not many functions are required of the workbench 20.

Moreover, the operation of bundling the electric wires 2 with the cable tie 10 is easier than the operation of wrapping a tape around electric wires. Therefore, a variation in the position where the cable tie 10 is attached is less likely to occur, and additionally a shorter time is needed for the operation. Particularly in this embodiment, the bundling position index jig 22 that indicates the position where the cable tie 10 is to be attached is provided on the workbench 20. This enables the cable tie 10 to be accurately attached in a predetermined position on the electric wires 2.

The conventional manufacturing method, in which the bending and branching shape of the wire harness is fixed by the tapes wrapped around the electric wires, causes variations in the dimension and shape of the wire harness depending on the manner of wrapping of the tapes. In this respect, the manufacturing method of this embodiment is not likely to cause variations in the shape of the wire harness 1*m* because the bending and branching shape of the electric wires 2 is fixed by the protectors 4 and moreover the interval between the protectors 4 is fixed by the corrugated pipe 8. Accordingly, the need to examine the dimension of the manufactured wire harness 1 can be simplified or omitted. This enables the wire harness 1 with a high quality to be manufactured at a low cost.

The operation of attaching the electric wires 2 to the protector 4 can be implemented merely by bringing the distal portion 11*a* of the cable tie 10 into engagement with the protector 4. Accordingly, the electric wires 2 can be easily and quickly attached to the protector 4, and in addition, the positions of the protector 4 and the electric wires 2 relative to each other can be settled with an accuracy.

As thus far described, the wire harness 1 of this embodiment includes the plurality of electric wires 2, the protectors 4, and the cable ties 10. The protector 4 defines at least either one of the bending shape and the branching shape of the plurality of electric wires 2. The cable tie 10 is attached to the electric wires 2, and includes the distal portion 11*a* that is to be attached to the protector 4. The protector 4 includes the engaging portion 13 engageable with the distal portion 11*a*. The positions of the electric wires 2 and the protector 4 relative to each other are settled by engagement of the distal portion 11*a* of the cable tie 10 attached to the electric wires 2 with the engaging portion 13

Such a configuration in which the protector 4 defines the bending shape or the branching shape of the electric wires 2 is able to improve accuracy of the dimension as compared with the conventional wire harness in which the tapes are used to fix the shape of the electric wires 2. Moreover, since the operation of wrapping the tapes around the electric wires 2 is not necessary, a time required for the manufacture of the wire harness 1 can be shortened. The operation of mounting the protector 4 to the electric wires 2 can be easily implemented merely by bringing the cable tie 10 into engagement with the protector 4.

The cable tie 10 of this embodiment includes the band 11 to be wound around the outer periphery of the plurality of electric wires 2. The cable tie 10 is attached to the electric wires 2 by bundling the plurality of electric wires 2 with the band 11.

Since the operation of bundling the electric wires 2 with the band 11 is easier than the operation of wrapping the tape around the electric wires 2, a time required for the operation can be shortened. Bundling the electric wires 2 with the band 11 results in attaching the cable tie 10 to the electric wires 2. Accordingly, there is no risk that a fixing force might deteriorate due to a decrease in an adhesive force, which risk would occur in, for example, a tape. This can improve durability of the wire harness 1.

In the wire harness 1 of this embodiment, the distal portion 11*a* of the band 11 is positioned only at one side of the electric wires 2 when seen in the longitudinal direction of the electric wires 2.

Accordingly, when a force is applied to the electric wires 2, the cable tie 10 is leans obliquely relative to the electric wires 2. As a result, the cable tie 10 bites into the outer periphery of the electric wires 2, which can increase the anchoring force anchoring the cable tie 10 and the electric wires 2 to each other.

In the wire harness 1 of the above-described embodiment, the protector 4 has a substantially U-like cross-sectional shape in a plane perpendicular to the longitudinal axis of the electric wires 2.

This enables the electric wires 2 to be housed inside the protector 4.

The wire harness 1 of the above-described embodiment includes the plurality of protectors 4 and the corrugated pipe 8 that is arranged between the plurality of protectors 4 and houses the electric wires 2 therein.

This enables a portion of the electric wires 2 located between the protectors 4 to be protected with the corrugated pipe 8. Entirely covering the electric wires 2 with a single protector 4 would deprive the wire harness 1 of flexibility. Providing the plurality of protectors 4 to the wire harness 1 as illustrated in this embodiment is able to give flexibility to a portion between the protectors 4 (a portion corresponding to the corrugated pipe 8). This provides improved assembly of the wire harness 1 to a vehicle or the like.

The protector 4 of the above-described embodiment includes the corrugated pipe engaging portion 15 that is engageable with corrugation formed in the outer periphery of the corrugated pipe 8.

Engagement of the corrugated pipe engaging portion 15 with the corrugated pipe 8 enables the corrugated pipe 8 to be fixed so as not to move relative to the protector 4.

In the wire harness 1 of the above-described embodiment, the distal portion 11*a* of the cable tie 10 and the engaging portion 13 are configured so as not to be engageable with each other when they are arranged in an abnormal manner.

Accordingly, an attempt to attach the cable tie 10 to an incorrect attaching position is failed. This leads to prevention of erroneous assembling.

As described above, the method for manufacturing the wire harness 1 of this embodiment includes the bundling step and the protector mounting step. The bundling step includes bundling, at a predetermined position, the plurality of electric wires 2 with the band 11 of the cable tie 10, to attach the cable tie 10 to the electric wires 2. The protector mounting step includes bringing the band 11 of the cable tie 10 attached to the electric wires 2 into engagement with the engaging portion 13 of the protector 4.

The wire harness 1 having a predetermined shape is formed by bundling the plurality of electric wires with the cable tie 10 and attaching the cable tie 10 to the protector 4. This manufacturing method, which does not need an operation of wrapping a tape for bundling the electric wires 2, achieves an improved efficiency of production. Since the dimension of each part of the wire harness 1 is determined by the protector 4, an improved accuracy of the dimension is also achieved.

In the manufacturing method of this embodiment, the bundling step includes: arranging a plurality of the bundle units 50 side by side in the horizontal direction, each of the bundle units 50 including the plurality of electric wires 2; and bundling, at a predetermined position, each of the plurality of bundle units 50 with the band 11 of the cable tie 10.

Arranging the bundle units 50 side by side in the horizontal direction enables the operator to sequentially bundle the bundle units 50 merely by moving in the horizontal direction. Since the path of motion of the operator is simple, paths of motion of a plurality of operators concurrently performing operations are not likely to be tangled, which results in that the operation is performed efficiently. Additionally, since the bundle units 50 are arranged side by side, the bundle units 50 are substantially in parallel with one another. This allows the operator to take almost the same posture each time he/she performs the operation of bundling the bundle unit 50 with the cable tie 10. This improves efficiency of the operation.

In the manufacturing method of this embodiment, in the bundling step, the workbench 20 including the bundling position index jigs 22 is used. The bundling position index jigs 22 hold the plurality of bundle units 50, respectively, in such a manner that the plurality of bundle units 50 are arranged side by side in the horizontal direction.

The operator performs the operation of attaching the cable ties 10 on the workbench 20, and thereby the operation of the bundling step can be performed efficiently. The size of the workbench 20 may be as small as it allows the bundle units 50 to be arranged side by side. Therefore, downsizing is enabled as compared with the conventional workbench.

In the manufacturing method of this embodiment, the workbench 20 at least includes the connector holding jig 21 and the bundling position index jigs 22. The connector holding jig 21 holds the connectors 3 in predetermined positions. The connectors 3 are provided at the terminals of the electric wires 2 included in the bundle units 50. The bundling position index jig 22 indicates, to the bundle unit 50, the position where the cable tie 10 is to be attached.

Use of the workbench 20 enables the cable tie 10 to be attached in the position that is at a predetermined distance from the connector 3.

In the workbench 20 of this embodiment, the connector holding jig 21 holds the plurality of connectors 3 arranged in a line.

Since the positions where the connectors 3 are held are arranged in a line, the operation of laying the electric wires 2 on the workbench 20 is easy.

The connector holding jig 21 described above includes the plurality of coupled sub-beams 23a, 23b, . . . , each of which holds one or more connectors 3 arranged side by side. The connector holding jig 21 is removable from the workbench 20.

Since the plurality of connectors 3 are held in the connector holding jig 21, the plurality of connectors 3 (and the electric wires 2 connected to them) can be collectively set on the workbench 20. When the connector holding jig 21 is divided into the plurality of sub-beams, the connectors 3 can be handled collectively on a sub-beam basis.

The sub-jig arranging step of this embodiment includes, subsequent to completion of the bundling step, removing the connector holding jig 21 holding the connectors 3 therein from the workbench 20, releasing the coupling of the connector holding jig 21 to divide the connector holding jig 21 into the plurality of sub-beams 23a, 23b, . . . , and arranging the sub-jigs on the protector mounting table. In the protector mounting step, the operation of mounting the protectors 4 is performed in the state where the sub-beams 23a, 23b, . . . , are arranged on the protector mounting table.

The coupling of the connector holding jig 21 is released and divided into the sub-beams 23a, 23b, . . . , and the sub-beams are arranged on the protector mounting table. This enables the connectors 3 (and the electric wires 2) to be arranged in positions suitable for mounting of the protectors 4. Since a plurality of connectors 3 can be handled collectively on the basis of the sub-beams 23a, 23b, . . . , the connectors 3 and the electric wires 2 can be efficiently arranged on the protector mounting table.

Next, a variation of the above-described embodiment will be described.

Figure 18:
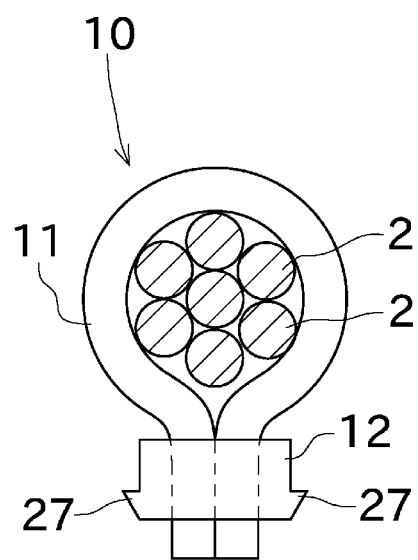
FIG. 18 A cross-sectional view showing an electric wire bundled by a cable tie that is formed through two-piece molding.

While the cable tie 10 of the above-described embodiment includes the band 11 and the buckle 12 integrally formed, this is not limiting. For example, the band 11 and the buckle 12 may be formed through two-piece molding, as shown in FIG. 18.

Figure 19:
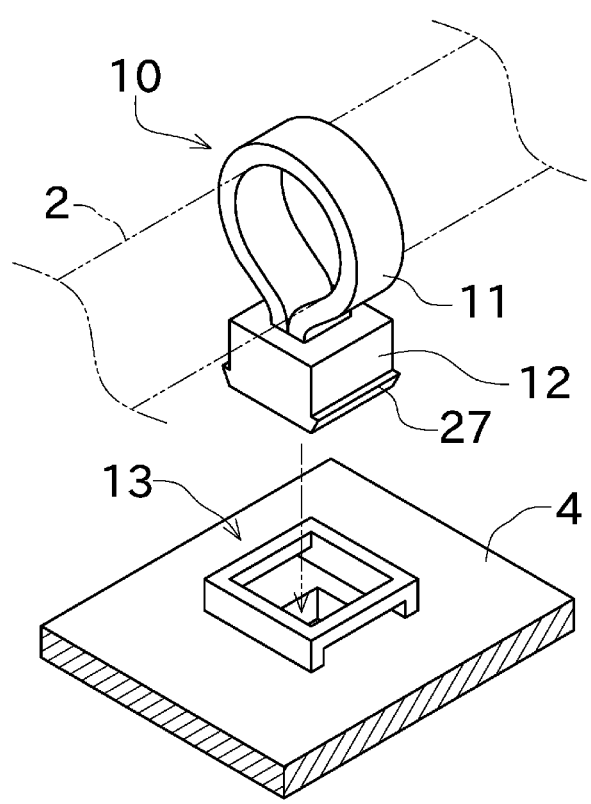
FIG. 19 A perspective view showing a first variation.

While the above-described embodiment illustrates the case where the distal portion 11a of the band 11 serves as a portion to be fixed to the protector, this is not limiting. For example, as shown in FIG. 18, the buckle 12 may be provided with engaging pawls (protector-attached portion) 27 protruding in the direction perpendicular to the longitudinal axis of the electric wires 2. In such a case, as shown in FIG. 19, the protector 4 is provided with engaging portions 13 engageable with the engaging pawls 27. Bringing the engaging pawls 27 into engagement with the engaging portions 13 settles the position of the electric wires 2 relative to the protector 4.

Figure 20:
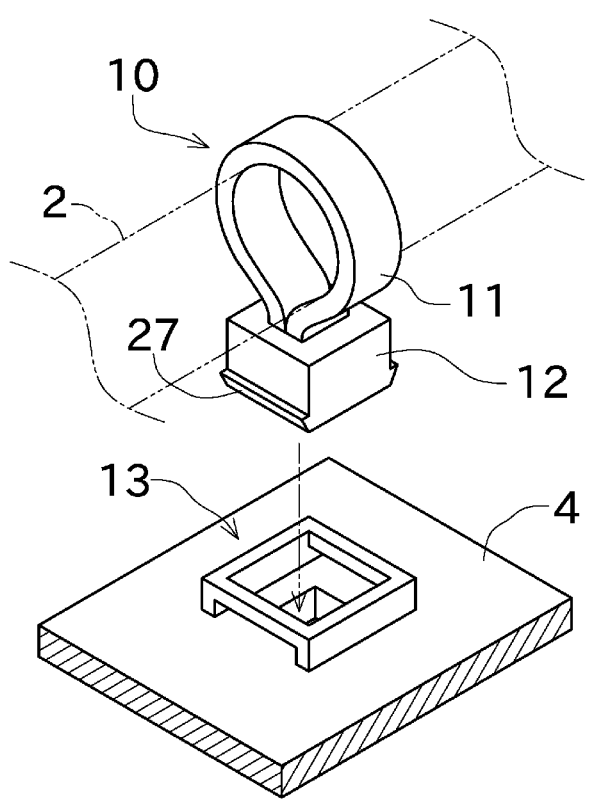
FIG. 20 A perspective view showing a second variation.
Figure 21:
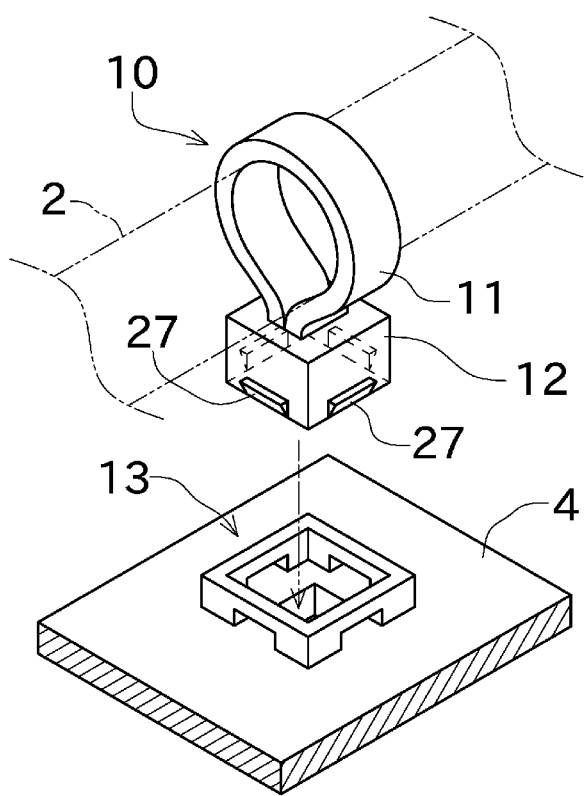
FIG. 21 A perspective view showing a third variation.

Kinds of variations of the configuration shown in FIG. 19 are conceivable. In an example shown in FIG. 20, the buckle 12 is provided with engaging pawls 27 protruding in the direction parallel to the longitudinal axis of the electric wires 2. An example shown in FIG. 21 is also acceptable, in which the buckle 12 is provided with engaging pawls 27 protruding in four directions (the direction parallel to the longitudinal axis and the direction perpendicular to the longitudinal axis of the electric wires 2). This enables the buckle 12 to be fixed to the protector 4 with an enhanced stability.

Figure 22:
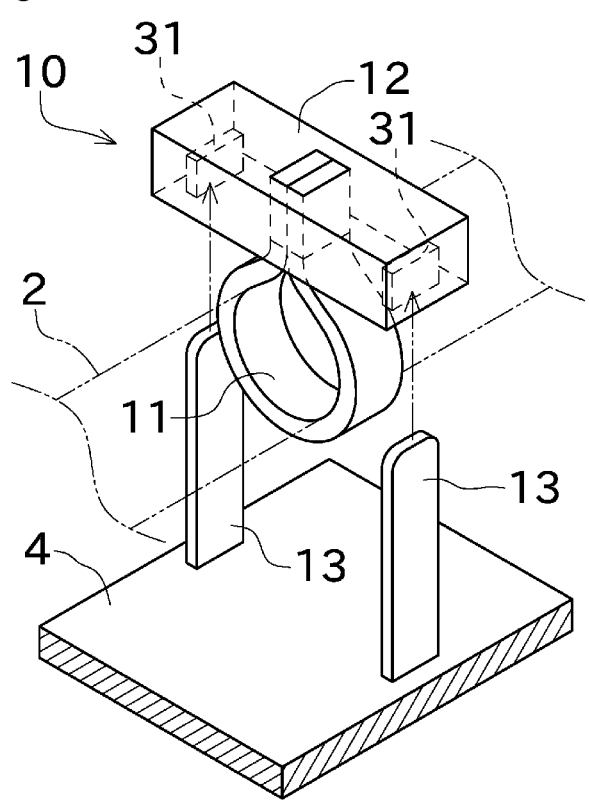
FIG. 22 A perspective view showing a fourth variation.

In a variation shown in FIG. 22, the protector 4 is provided with engaging portions 13 each having a plug-like shape that protrudes upward from the bottom surface of the protector 4. The buckle 12 of the cable tie 10 is provided with socket portions 31 each allowing the plug-like engaging portion 13 to be inserted therein. Inserting (engaging) the engaging portions 13 into the socket portions 31 results in attaching the cable tie 10 to the protector 4. The plug-like engaging portions 13 are provided in a pair arranged across the electric wires 2 therebetween. This can stably settle the position of the electric wires 2 relative to the protector 4.

Figure 23:
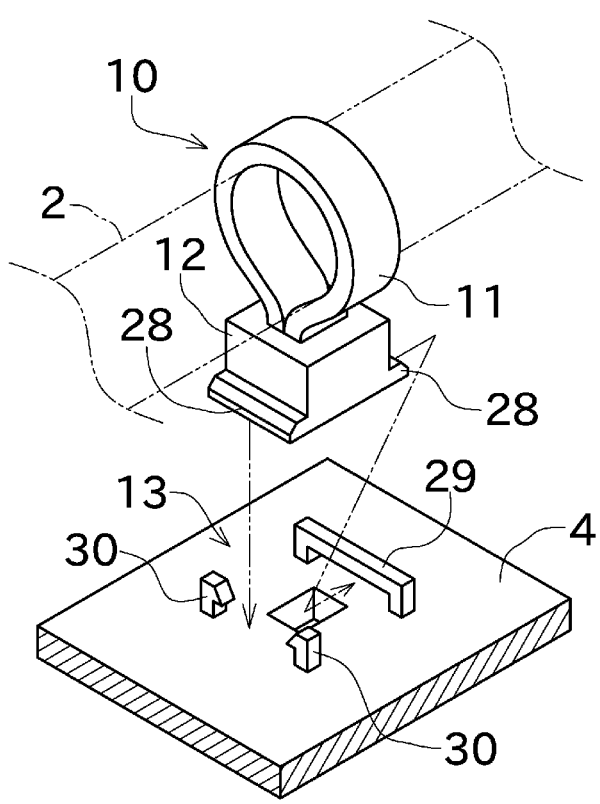
FIG. 23 A perspective view showing a fifth variation.

In a variation shown in FIG. 23, the buckle 12 is provided with a pair of engaging pawls 28. The engaging portion 13 of the protector 4 is provided with a receiving portion 29 and a locking pawl 30. The receiving portion 29 allows one of the engaging pawls 28 to be inserted therein. The locking pawl 30 is engageable with the other engaging pawl 28. One of the engaging pawls 28 of the buckle 12 is inserted in the receiving portion 29, and in this condition, the buckle 12 is pressed to the protector 4. As a result, the locking pawl 30 is deformed to bring the locking pawl 30 into engagement with the engaging pawl 28.

Figure 24:
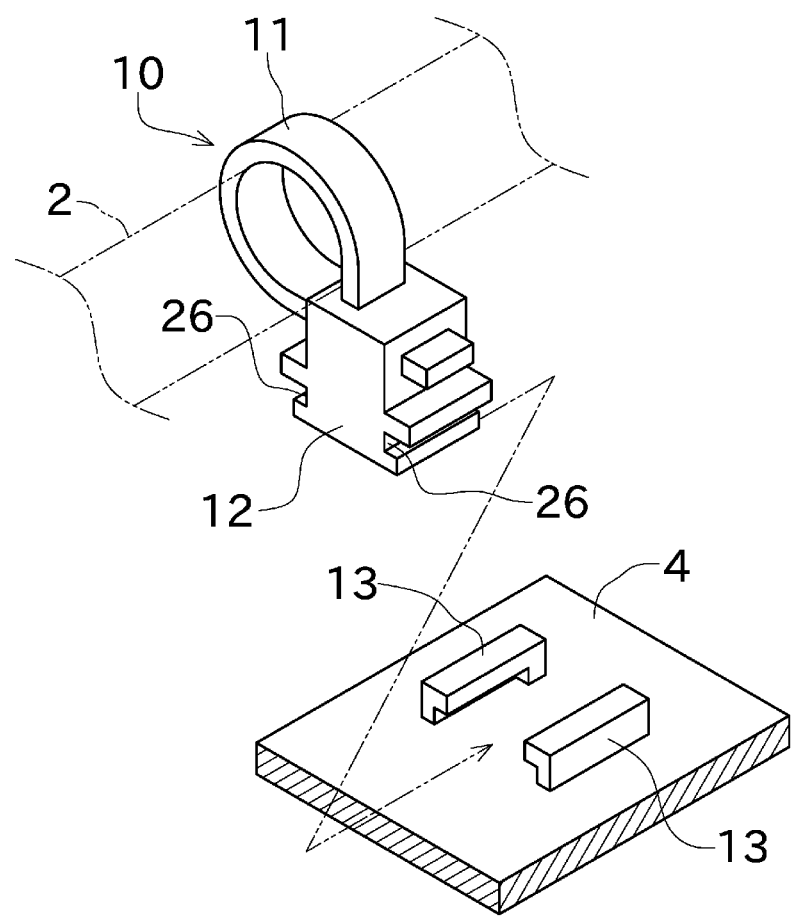
FIG. 24 A perspective view showing a sixth variation.

In any of the variations shown in FIGS. 19 to 23, the buckle 12 is provided with the protector-attached portion of the cable tie 10 including the band 11 and the buckle 12 formed through two-piece molding. This is, however, not essential, and the cable tie 10 including the band 11 and the buckle 12 integrally formed may be also configured such that the buckle 12 is provided with a protector-attached portion. For example, in an variation shown in FIG. 24, the buckle 12 of the cable tie 10 is provided with grooves 26 extending in parallel with the longitudinal axis of the electric wires 2. The protector 4 is provided, on the bottom surface thereof, with engaging portions 13 each having a rail-like shape extending in the longitudinal direction of the electric wires. Each of the engaging portions 13 has an L-like cross-sectional shape that is engageable with each of the grooves 26. Bringing the rail-like engaging portions 13 into engagement with the grooves 26 and sliding the cable tie 10 relative to the protector 4 in the longitudinal direction of the electric wires 2 results in attaching the cable tie 10 to the protector 4.

Figure 25:
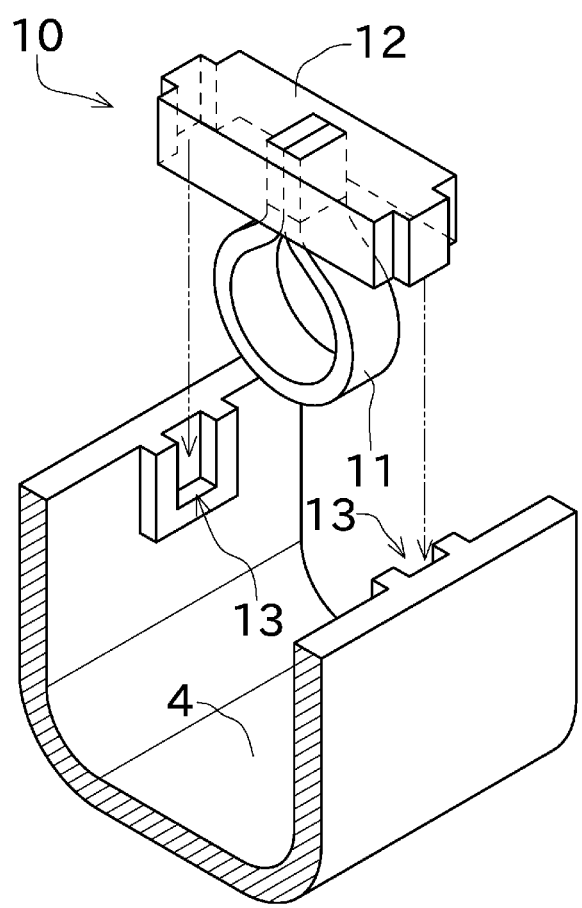
FIG. 25 A perspective view showing a seventh variation.

In the above-described embodiment and variations, the engaging portion 13 is provided in the bottom surface of the protector 4, but the position where the engaging portion 13 is provided is not limited to the bottom surface of the protector 4. For example, in a variation shown in FIG. 25, the protector 4 having a U-like cross-sectional shape is provided, on the opposite side walls of the U-like shape, engaging portions 13 capable of hooking the buckle 12 of the cable tie 10.

The configuration of the engaging portion 13 of the protector 4 and the configuration of the protector-attached portion of the cable tie 10 are not limited to the ones illustrated in the above-described embodiment and variations. They may be modified as appropriate.

Next, another variation of the above-described embodiment will be described with reference to FIG. 26.

In the wire harness 1 of the above-described embodiment, as mentioned above, the engaging portion 13 is provided in the bottom surface of the protector 4 having a U-like cross-sectional shape. In such a configuration, the operator's finger is likely to interfere with the opposite side walls of the protector 4 having a U-like cross-sectional shape when performing the operation of bringing the cable tie 10 into engagement with the engaging portion 13.

Figure 26:
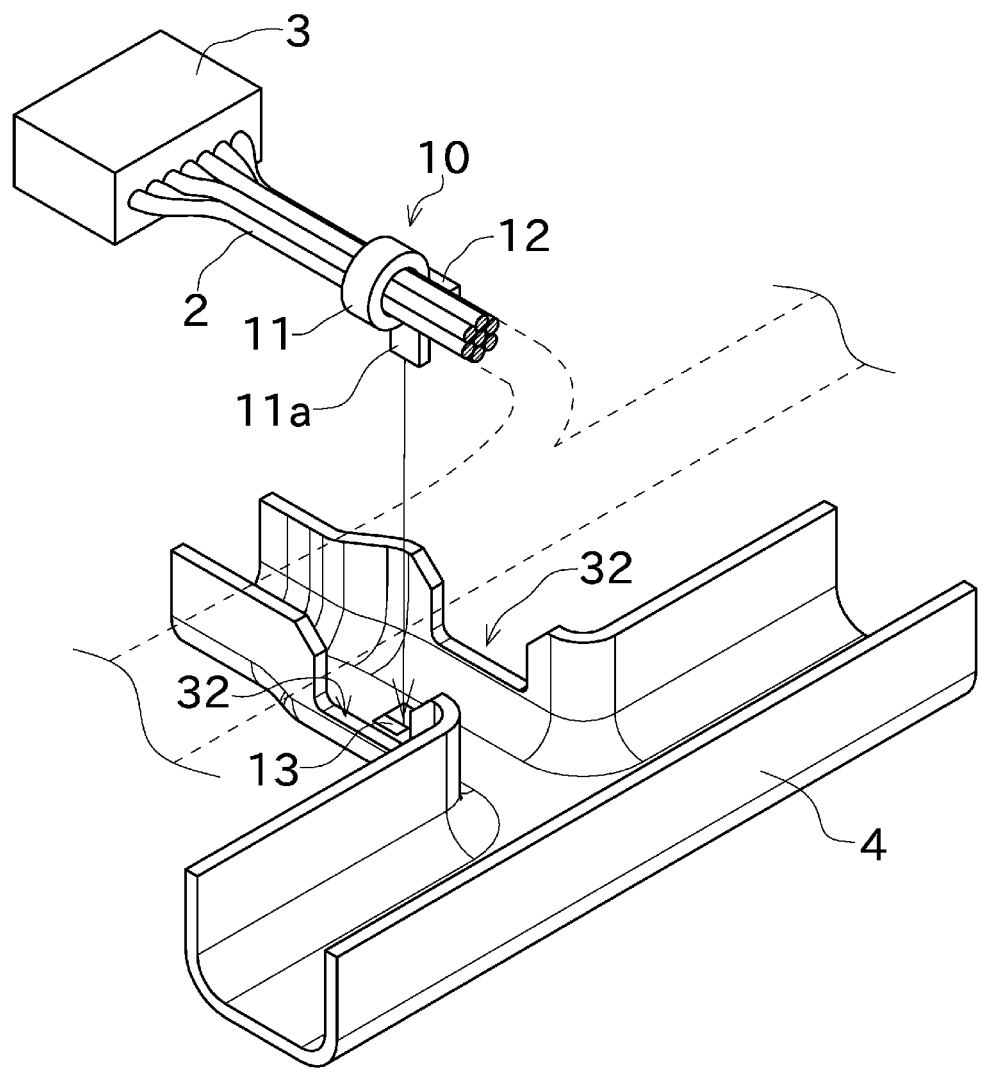
FIG. 26 A perspective view showing still another variation.

Therefore, as shown in FIG. 26, this variation provides notches 32 in the opposite side walls of the protector 4 having a U-like cross-sectional shape. The notches 32 are provided near the engaging portion 13. This makes it less likely that the operator's finger interferes with the opposite side walls of the protector 4 having a U-like cross-sectional shape when performing the operation of bringing the cable tie 10 into engagement with the engaging portion 13. Accordingly, the workability in the operation of attaching the cable tie 10 to the protector 4 is further improved. In FIG. 21, the notch 32 is provided in each of the opposite side walls of the protector 4 having a U-like cross-sectional shape, but it may be acceptable that the notch 32 is provided in either one of the side walls.

In this variation, the engaging portion 13 is provided in the bottom surface of the U-shaped protector 4. The protector 4 has the notch 32 provided in at least either one of the opposite side walls of the U-like shape. The notch 32 is provided near the engaging portion 13.

This makes it less likely that the operator's finger interferes with the protector 4 in the vicinity of the engaging portion 13. Accordingly, the workability of the operation of bringing the cable tie 10 into engagement with the engaging portion 13 of the protector 4 is improved.

Although a preferred embodiment of the present invention has been described above, the above-described configuration can be modified, for example, as follows.

The present invention is applicable not only to a wire harness for use in an automobile but also wire harnesses for other uses.

In the above-described embodiment, the fixing member is the cable tie 10, but this is not limiting. Any configuration is adoptable as the fixing member as long as it is able to bundle a plurality of electric wires and able to be fixed to the protector 4.

In the above-described embodiment, the protector 4 has a U-like cross-sectional shape, but this is not limiting. Any shape is adoptable as long as it is able to restrict the bending shape or the branching shape of the electric wires 2.

In the above-described embodiment and variations, the engaging portion 13 is provided in the bottom surface or side surfaces of the protector 4 having a U-like cross-sectional shape, this is not limiting. For example, the engaging portion 13 may be provided in the lid 19 of the protector 4.

In the above-described embodiment, one protector 4 connected to another protector 4 with the corrugated pipe 8 interposed therebetween has its position settled (in succession) relative to the electric wires 2. Therefore, the protector 4 connected to another protector with the corrugated pipe 8 interposed therebetween may permit elimination of a configuration (for example, the cable tie 10 and the engaging portion 13) provided for the purpose of settling the positions of the protector 4 and the electric wires 2 relative to each other.

The corrugated pipe 8 may be omitted.

Although the workbench 20 is arranged in the substantially vertical direction, this is not limiting. For example, the workbench 20 may be arranged substantially horizontally, or may be arranged obliquely relative to the vertical direction; however arranging the workbench 20 in the substantially vertical direction, which allows the electric wires 2 to hang down from the connectors 3, provides a benefit that the force of gravity can be used to lay the electric wires 2 on the workbench 20.

Although the above-described embodiment illustrates a U-shaped jig as the bundling position index jig 22, this is not limiting. Any approach is adoptable as long as it is able to indicate the position where the cable tie 10 is to be attached. Moreover, the bundling position index jig 22 of the embodiment described above is so shaped as to restrict the route through which the electric wires 2 are laid, which however may not always limiting. It may be also acceptable that the bundling position index jig 22 does not have the function of restricting the route through which the electric wires 2 are laid.

DESCRIPTION OF THE REFERENCE NUMERALS 1 wire harness
2 electric wire
3 connector
4 protector
10 cable tie (fixing member)
11 band (bundling portion, protector-attached portion)
13 engaging portion
20 workbench
50 bundle unit

The invention claimed is:

1. A wire harness comprising:
a plurality of electric wires;
a protector that defines at least either one of a bending shape and a branching shape of the plurality of electric wires; and
a fixing member attached to the electric wires, the fixing member including a protector-attached portion to be attached to the protector;
the protector including an engaging portion engageable with the protector-attached portion,
positions of the electric wires and the protector relative to each other being settled by engagement of the protector-attached portion of the fixing member attached to the electric wires with the engaging portion, wherein
the protector has a U-like cross-sectional shape in a plane perpendicular to a longitudinal direction of the electric wires,
the engaging portion is provided in a bottom surface of the U-like shape of the protector, and
the protector has a notch formed in at least either one of opposite side walls of the U-like shape, the notch being provided near the engaging portion.

2. The wire harness according to claim 1, wherein the fixing member includes:
a band to be wound around an outer periphery of the plurality of electric wires; and
a buckle that receives the band inserted therein,
the fixing member is attached to the electric wires by bundling the plurality of electric wires with the band and the buckle.

3. The wire harness according to claim 2, wherein the protector-attached portion is positioned only at one side of the electric wires when seen in a longitudinal direction of the electric wires.

4. The wire harness according to claim 1, comprising:
a plurality of protectors; and
a corrugated pipe that is arranged between the plurality of protectors and houses the electric wires therein.

5. The wire harness according to claim 4, wherein the protector includes a corrugated pipe engaging portion that is engageable with corrugation formed in an outer periphery of the corrugated pipe.

6. The wire harness according to claim 1, wherein the protector-attached portion and the engaging portion are configured so as not to be engageable with each other when they are arranged in an abnormal manner.

7. A method for manufacturing a wire harness comprising:
a plurality of electric wires;
a protector that defines at least either one of a bending shape and a branching shape of the plurality of electric wires; and
a fixing member including a bundling portion that bundles the plurality of electric wires and a protector-attached portion that is to be attached to the protector,
the method including:
a bundling step of bundling, at a first predetermined position, the plurality of electric wires by the bundling portion, to attach the fixing member to the electric wires; and
a protector mounting step of mounting, to the protector, the protector-attached portion of the fixing member attached to the electric wires,
wherein, in the bundling step, a plurality of bundle units each including a plurality of electric wires are arranged side by side in a predetermined direction, and each of the plurality of bundle units is, at a second predetermined position, bundled by the bundling portion of the fixing member,
wherein, in the bundling step, a workbench including a jig is used, the jig holding each of the plurality of bundle units in such a manner that the plurality of bundle units are arranged side by side in a predetermined direction, and
wherein the workbench at least includes:
a connector holding jig that holds a connector in a third predetermined position, the connector being provided at a terminal of the electric wires included in the bundle unit; and
a bundling position index jig that indicates a position where the fixing member is to be attached to the bundle unit, wherein
in the workbench, the connector holding jig holds a plurality of the connectors arranged in a line, and
the connector holding jig includes a plurality of coupled sub-jigs, each of the sub-jigs holding one or more connectors arranged side by side, the connector holding jig being removable from the workbench.

8. The method for manufacturing the wire harness according to claim 7, comprising a sub-jig arranging step of, subsequent to completion of the bundling step, removing the connector holding jig holding the connectors therein from the workbench, releasing the coupling of the connector holding jig to divide the connector holding jig into a plurality of the sub-jigs, and arranging the sub-jigs on a protector mounting table, wherein
in the protector mounting step, an operation of mounting the protector is performed in a state where the sub-jigs are arranged on the protector mounting table.

* * * * *